US007058202B2

(12) United States Patent
Amidror

(10) Patent No.: US 7,058,202 B2
(45) Date of Patent: Jun. 6, 2006

(54) AUTHENTICATION WITH BUILT-IN ENCRYPTION BY USING MOIRE INTENSITY PROFILES BETWEEN RANDOM LAYERS

(75) Inventor: Isaac Amidror, Lausanne (CH)

(73) Assignee: Ecole polytechnique fédérale de Lausanne (EPFL), Lausanne (CH)

( * ) Notice: Subject to any disclaimer, the term of this patent is extended or adjusted under 35 U.S.C. 154(b) by 777 days.

(21) Appl. No.: 10/183,550

(22) Filed: Jun. 28, 2002

(65) Prior Publication Data

US 2004/0001604 A1 Jan. 1, 2004

(51) Int. Cl.
*G06K 9/00* (2006.01)

(52) U.S. Cl. ......................... 382/100; 380/100; 283/93

(58) Field of Classification Search ..................... None
See application file for complete search history.

(56) References Cited

U.S. PATENT DOCUMENTS

| | | | | |
|---|---|---|---|---|
| 5,018,767 | A | 5/1991 | Wicker | 283/67 |
| 5,025,285 | A * | 6/1991 | Schwarz | 355/77 |
| 5,275,870 | A | 1/1994 | Halope et al. | 428/199 |
| 5,396,559 | A | 3/1995 | McGrew | 380/54 |
| 5,613,013 | A | 3/1997 | Schuette | 382/124 |
| 5,712,731 | A | 1/1998 | Drinkwater et al. | 359/619 |
| 5,830,548 | A * | 11/1998 | Andersen et al. | 428/36.4 |
| 5,995,638 | A * | 11/1999 | Amidror et al. | 382/100 |
| 6,045,477 | A * | 4/2000 | Schmidt | 475/207 |
| 6,198,545 | B1 | 3/2001 | Ostromoukhov et al. | 358/459 |
| 6,249,588 | B1 * | 6/2001 | Amidror et al. | 382/100 |
| 6,423,478 | B1 * | 7/2002 | Ha | 430/321 |
| 6,532,082 | B1 * | 3/2003 | Dewitte | 358/3.3 |

FOREIGN PATENT DOCUMENTS

| | | |
|---|---|---|
| GB | 1138011 | 12/1968 |
| GB | 2224240 A | 5/1990 |

OTHER PUBLICATIONS

U.S. Appl. No. 09/902,445, filed Jul. 11, 2001, Amidrov et al.

U.S. Appl. No. 09/477,544, filed Jan. 4, 2000, Ostromoukhov et al.

Glass patterns revisited: a unified approach for the explanation of stochastic and periodic moires, by I. Amidror. Submitted to the Journal of the Opt. Soc. of America A, 2002.

(Continued)

*Primary Examiner*—Brian Werner
*Assistant Examiner*—Christopher Lavin

(57) ABSTRACT

This invention discloses new methods, security devices and apparatuses for authenticating documents and valuable articles which may be applied to any support, including transparent synthetic materials and traditional opaque materials such as paper. The invention relates to moire intensity profiles which occur in the superposition of specially designed random structures. By using specially designed random basic screen and random master screen, where at least the basic screen is comprised in the document, a moire intensity profile of a chosen shape becomes visible in their superposition, thereby allowing the authentication of the document. An important advantage of the present invention is that it can be incorporated into the standard document printing process, so that it offers high security at the same cost as standard state of the art document production. Another major advantage of the present invention is in its intrinsically incorporated encryption system due to the arbitrary choice of the random number sequences for the generation of the specially designed random dot screens that are used in this invention.

57 Claims, 20 Drawing Sheets

OTHER PUBLICATIONS

Fourier-based analysis and synthesis of moires in the superposition of geometrically transformed periodic structures, by I. Amidror and R.D. Hersch; Journal of the Optical Society of America A, vol. 15, 1998; pp. 1100-1113.

The Theory of the Moire Phenomenon, by I. Amidror, Kluwer Academic Publishers, 2000.

A Generalized Fourier-Based Method for the Analysis of 2D Moire Envelope-Forms in Screen Superpositions, by I. Amidror; Journal of Modern Optics, vol. 41, No. 9, 1994; pp. 1837-1862.

Microlens arrays, by M. Hutley et al.; Physics World, Jul. 1991; pp. 27-32.

New imaging functions of moire by fly's eye lenses, by O. Mikami; Japan Journal of Applied Physics, vol. 14, No. 3, 1975; pp. 417-418.

New image-rotation using moire lenses, by o. Mikami; Japan Journal of Applied Physics, vol. 14, No. 7, 1975; pp. 1065-1066.

Artistic screening, by V. Ostromoukhov and R.D. Hersch; SIGGRAPH Annual Conference, 1995, pp. 219-228.

Multi-color and artistic dithering, by V. Ostromoukhov and R. D. Hersch; SIGGRAPH Annual Conference, 1999, pp. 425-432.

Application of laser technology to introduce security features on security documents in order to reduce counterfeiting, by W. Hospel; SPIE vol. 3314, 1998, pp. 254-259.

Halftone patterns for arbitrary screen periodicities, by T.S. Rao and G.R. Arce; Journal of the Opt. Soc. of America A, vol. 5, 1988, pp. 1502-1511.

Halftone images: spatial resolution and tone reproduction, by O. Bryngdahl; Journal of the the Opt. Soc. of America, vol. 68, 1978, pp. 416-422.

Moire effect from random dots, by L. Glass; Nature, vol. 223, Aug. 1969, pp. 578-580.

Perception of random dot interference patterns, by L. Glass and R. Pérez; Nature, vol. 246, Dec. 1973, pp. 360-362.

CRC Concise Encyclopedia of Mathematics, by E. W. Weisstein, CRC, Boca Raton, 1999, pp. 176, 653.

J. W. Wesner, "Screen patterns used in reproduction of continous-tone graphics", Applied Optics, vol. 13, 1974, pp. 1703-1710.

J. Walker, "The amateur scientist: Visual illusions in random-dot patterns and television 'snow'", Scientific American, vol. 242, 1980, pp. 136-140.

J. Walker, "The amateur scientist: More about random-dot displays plus computer programs to generate them", Scientific American, vol. 243, 1980, pp. 158-159, 163-168.

H. Kipphan, Handbook of Print Media. Springer, Berlin, 2001, pp. 92-99.

M. Rodriguez, "Promises and pitfalls of stochastic screening in the graphic arts industry", Proceedings of te IS&T 47th annual conference, Rochester, NY, 1994.

* cited by examiner

AUTHENTICATION WITH BUILT-IN ENCRYPTION BY USING MOIRE INTENSITY PROFILES BETWEEN RANDOM LAYERS

This application is related to U.S. patent application Ser. No. 08/520,334 filed Aug. 28, 1995, now U.S. Pat. No. 6,249,588, granted Jun. 19, 2001, to its continuation-in-part U.S. patent application Ser. No. 08/675,914 filed Jul. 5, 1996, now U.S. Pat. No. 5,995,638, granted Nov. 30, 1999, and to U.S. patent application Ser. No. 09/902,445 filed Jul. 11, 2001.

BACKGROUND OF THE INVENTION

The present invention relates generally to the field of anticounterfeiting and authentication methods and devices and, more particularly, to methods, security devices and apparatuses for authentication of documents and valuable articles using the intensity profile of moire patterns.

Counterfeiting of documents such as banknotes is becoming now more than ever a serious problem, due to the availability of high-quality and low-priced color photocopiers and desk-top publishing systems. The same is also true for other valuable products such as CDs, DVDs, software packages, medical drugs, etc., that are often marketed in easy to counterfeit packages.

The present invention is concerned with providing a novel security element and authentication means offering enhanced security for banknotes, checks, credit cards, identity cards, travel documents, industrial packages or any other valuable articles, thus making them much more difficult to counterfeit.

Various sophisticated means have been introduced in prior art for counterfeit prevention and for authentication of documents or valuable articles. Some of these means are clearly visible to the naked eye and are intended for the general public, while other means are hidden and only detectable by the competent authorities, or by automatic devices. Some of the already used anti-counterfeit and authentication means include the use of special paper, special inks, watermarks, micro-letters, security threads, holograms, etc. Nevertheless, there is still an urgent need to introduce further security elements, which do not considerably increase the cost of the produced documents or goods.

Moire effects have already been used in prior art for the authentication of documents. For example, United Kingdom Pat. No. 1,138,011 (Canadian Bank Note Company) discloses a method which relates to printing on the original document special elements which, when counterfeited by means of halftone reproduction, show a moire pattern of high contrast. Similar methods are also applied to the prevention of digital photocopying or digital scanning of documents (for example, U.S. Pat. No. 5,018,767 (Wicker), or U.K. Pat. Application No. 2,224,240 A (Kenrick & Jefferson)). In all these cases, the presence of moire patterns indicates that the document in question is counterfeit. Other prior art methods, on the contrary, take advantage of the intentional generation of a moire pattern whose existence, and whose precise shape, are used as a means of authenticating the document. One known method in which a moire effect is used to make visible an image encoded on the document (as described, for example, in the section “Background” of U.S. Pat. No. 5,396,559 (McGrew)) is based on the physical presence of that image on the document as a latent image, using the technique known as “phase modulation”. In this technique, a uniform line grating or a uniform random screen of dots is printed on the document, but within the pre-defined borders of the latent image on the document the same line grating (or respectively, the same random dot-screen) is printed in a different phase, or possibly in a different orientation. For a layman, the latent image thus printed on the document is hard to distinguish from its background; but when a reference transparency comprising an identical, but unmodulated, line grating (respectively, random dot-screen) is superposed on the document, thereby generating a moire effect, the latent image pre-designed on the document becomes clearly visible, since within its pre-defined borders the moire effect appears in a different phase than in the background. However, this previously known method has the major flaw of being simple to simulate, since the form of the latent image is physically present on the document and only filled by a different texture. The existence of such a latent image on the document will not escape the eye of a skilled person, and moreover, its imitation by filling the form by a texture of lines (or dots) in an inversed (or different) phase can easily be carried out by anyone skilled in the graphics arts.

Other moire based methods, in which the presence of moire intensity profiles indicates the authenticity of the document, have been disclosed by Amidror and Hersch in U.S. Pat. No. 6,249,588 and its continuation-in-part U.S. Pat. No. 5,995,638. These methods completely differ from the above mentioned technique, since no phase modulation is used, and furthermore, no latent image is present on the document. On the contrary, all the spatial information which is made visible by the moire intensity profiles according to the inventions of Amidror and Hersch is encoded in the specially designed forms of the individual dots which constitute the dot-screens. These inventions are based on specially designed periodic structures, such as dot-screens (including variable intensity dot-screens such as those used in real, full gray level or color halftoned images), pinhole-screens, or microlens arrays, which generate in their superposition periodic moire intensity profiles of any chosen colors and shapes (letters, digits, the country emblem, etc.) whose size, location and orientation gradually vary as the superposed layers are rotated or shifted on top of each other. In U.S. Pat. No. 5,712,731 (Drinkwater et al.) another moire based method is disclosed which, unlike the above mentioned inventions, can be combined within a hologram or a kinegram, or with parallax effects due to the varying view angles of the observer. However, this last disclosure has the disadvantage of being limited only to the case where the superposed revealing structure is a microlens array and the periodic structure on the document is a constant dot-screen with identical dot-shapes throughout. Thus, in contrast to the inventions of Amidror and Hersch, this disclosure excludes the use of dot-screens or pinhole-screens as revealing structures, as well as the use on the document of full, real halftoned images with varying tone levels (such as portraits, landscapes, etc.), either in full gray levels or in color, that are made of halftone dots of varying sizes and shapes—which are the core of the methods disclosed by Amidror and Hersch, and which make them so difficult to counterfeit.

In a third invention, U.S. patent application Ser. No. 09/902,445, Amidror and Hersch disclose new methods improving their previously disclosed methods mentioned above, and which make them even more difficult to counterfeit. These new improvements make use of the theory developed in the paper “Fourier-based analysis and synthesis of moires in the superposition of geometrically transformed periodic structures” by I. Amidror and R. D. Hersch, Journal of the Optical Society of America A, Vol. 15, 1998, pp. 1100–1113 (hereinafter, "[Amidror98]"), and in the book "The Theory of the Moire Phenomenon" by I. Amidror, Kluwer, 2000 (hereinafter, "[Amidror00]"). Based on this theory, the said third invention discloses how to use aperiodic, geometrically transformed structures which in spite of being aperiodic in themselves, still generate, when they are superposed on top of one another, periodic moire intensity profiles with clearly visible and undistorted elements, just like in the periodic cases disclosed by Amidror and Hersch in their previous U.S. Pat. No. 6,249,588 and its continuation-in-part U.S. Pat. No. 5,995,638. Furthermore, it was disclosed there how even cases which do not yield periodic moires can still be advantageously used for anticounterfeiting and authentication of documents and valuable articles.

The present invention differs from all of the previous disclosures mentioned above. It is based on a new discovery made by the present inventor, that if, instead of superposing two periodic or repetitive geometrically transformed dot screens, we superpose two specially designed random or pseudorandom dot-screens which are fully or partially correlated, a moire intensity profile will be generated in the superposition, which is not repeated throughout, as in the periodic or repetitive cases, but consists of one single copy of the moire intensity profile whose size, location and orientation gradually vary as the superposed layers are rotated or shifted on top of each other. This surprising discovery is based on the mathematical theory introduced by the present inventor in a paper entitled "Glass patterns revisited: a unified approach for the explanation of stochastic and periodic moires", which was recently submitted to the Journal of the Opt. Soc. of America A (hereinafter, "[Amidror02]"). However, this paper did not anticipate the possibility of generating a moire intensity profile of any desired shape based on the design of the individual dot shapes of the superposed layers, nor did it disclose the applications of this surprising result to the security of documents and valuable articles. These new discoveries of the present inventor are thus disclosed for the first time in the present invention. As it will be explained in detail below, a major advantage of the present invention over all previous disclosures is in its intrinsically incorporated encryption system due to the arbitrary choice of the random number sequences for the generation of the specially designed random dot screens that are used in this invention.

Finally, it should be stressed that the present invention completely differs from the above mentioned technique of phase modulation based on random dot screens (U.S. Pat. No. 5,396,559 (McGrew)), since in the present invention no phase modulation is used, and furthermore, no latent image is present on the document. On the contrary, all the spatial information which is made visible by the moire intensity profile according to the present invention is encoded in the specially designed forms of the individual dots which constitute the random dot-screens.

SUMMARY OF THE INVENTION

The present invention relates to new methods, security devices and apparatuses for authenticating documents (such as banknotes, trust papers, securities, identification cards, passports, etc.) or other valuable articles (such as optical disks, CDs, DVDs, software packages, medical products, etc.). In order to fully understand the present invention and its advantages, it would be useful to summarize first the principles of the original methods disclosed by Amidror and Hersch in U.S. Pat. No. 6,249,588 and its continuation-in-part U.S. Pat. No. 5,995,638. These methods are based on the moire intensity profiles which are generated between two or more specially designed periodic dot-screens, at least one of which being located on the document itself. Each periodic dot-screen consists of a lattice of tiny dots, and is characterized by three parameters: its repetition frequency, its orientation, and its dot shapes. These periodic dot-screens are similar to dot-screens which are used in classical halftoning, but they have specially designed dot shapes, frequencies and orientations. When the second dot-screen (or a corresponding microlens array) is laid on top of the first dot-screen, in the case where both of them have been designed in accordance with the inventors' disclosures, there appears in the superposition a highly visible repetitive moire pattern of a predefined intensity profile shape, whose size, location and orientation gradually vary as the superposed layers are rotated or shifted on top of each other. As an example, this repetitive moire pattern may comprise any predefined letters, digits or any other preferred symbols (such as the country emblem, the currency, etc.).

In a third invention, U.S. patent application Ser. No. 09/902,445, Amidror and Hersch disclose new methods and security devices which are even more difficult to counterfeit. According to the theory developed in [Amidror98] and [Amidror00] it is possible by using certain mathematical rules to synthesize geometrically transformed structures which in spite of being aperiodic in themselves, still generate, when they are superposed on top of one another, periodic moire intensity profiles with clearly visible and undistorted elements, just like in the periodic cases disclosed by Amidror and Hersch in their previous U.S. Pat. No. 6,249,588 and its continuation-in-part U.S. Pat. No. 5,995,638.

Furthermore, it is shown in this third invention how even cases which do not yield periodic moires can still be advantageously used for anticounterfeiting and authentication of documents and valuable articles. In all of these new cases, each dot-screen is also characterized by a fourth parameter, in addition to the three parameters that were already mentioned above in the periodic case. This fourth parameter is the geometric transformation which has been applied to the originally periodic dot-screen in order to obtain the aperiodic, geometric transformed dot-screen in accordance with this third invention.

In all of these inventions by Amidror and Hersch, the moire intensity profile that is generated in the layer superposition is periodic or repetitive, meaning that it consists of a multitude of copies of the moire intensity profile that scroll across the superposition as the superposed layers are shifted on top of each other. Although in some applications this repetitivity of the moire intensity profile may be advantageous, in other cases it may be clearly undesireable, for example when the repeated letters may be misinterpreted or lead to confusion. However, in the previous inventions of Amidror and Hersch it is not possible to avoid the repetitivity of the moire intensity profiles in the superposition, due to the periodic or repetitive nature of the superposed layers, which is a necessary condition for the generation of the moire intensity profile.

In the present invention, however, it is disclosed for the first time that in spite of the theoretic considerations which enforce the repetitivity of the moire intensity profiles in the layer superposition, it is still possible to prepare specially designed dot screens that give in their superposition a single copy of the moire intensity profile. This surprising result seems at first to contradict the fundamental theoretic considerations which govern the generation of moire intensity profiles in the superposition; but in fact, as it will be explained below, this surprising result does not contradict the established theory, but simply extends it to new cases which were until now beyond its scope, and thus, excluded from practical use. Indeed, it was recently discovered by the present inventor that if, instead of superposing two periodic or repetitive geometrically transformed dot screens, we superpose two specially designed random or pseudorandom dot-screens which are fully or partially correlated, a moire intensity profile will be generated in the superposition, which is not repeated throughout, as in the periodic or repetitive cases, but consists of one single copy of the moire intensity profile, whose size, location and orientation gradually vary as the superposed layers are rotated or shifted on top of each other.

When the second dot-screen (hereinafter: "the master screen") is laid on top of the first dot-screen (hereinafter: "the basic screen"), in the case where both screens have been designed in accordance with the present disclosure, there appears in the superposition a single, highly visible but non-repetitive moire pattern of a predefined intensity profile shape. For example, the non-repetitive moire pattern may consist of any predefined letters, digits or any other preferred symbols (such as the country emblem, the currency, etc.). Just as in the periodic or repetitive cases previously disclosed by Amidror and Hersch, when the master screen and the basic screen are rotated or shifted on top of each other, the size, the location and the orientation of the resulting moire intensity profile are varied; but unlike in the previous disclosures, the moire intensity profile of the present disclosure remains unique and non-repetitive. Furthermore, as it will be explained in detail below, a major advantage of the present invention over all previous disclosures is in its intrinsically incorporated encryption system due to the arbitrary choice of the random number sequences for the generation of the specially designed random dot screens that are used in this invention.

As disclosed in U.S. Pat. No. 5,275,870 (Halope et al.) it may be advantageous in the manufacture of long lasting documents or documents which must withstand highly adverse handling to replace paper by synthetic material. Transparent sheets of synthetic materials have been successfully introduced for printing banknotes (for example, Australian banknotes).

The present invention concerns new methods for authenticating documents which may be printed on various supports, including (but not limited to) such transparent synthetic materials. It should be noted that the term "documents" refers throughout the present disclosure to all possible printed articles, including (but not limited to) banknotes, passports, identity cards, credit cards, labels, optical disks, CDs, DVDs, packages of medical drugs or of any other commercial products, etc. Although the present invention may have several embodiments and variants, three embodiments of particular interest are given here by the way of example, without limiting the scope of the invention to these particular embodiments. In one embodiment of the present invention, the moire intensity profile shapes can be visualized by superposing a basic screen and a master screen which are both located on two different areas of the same document. In a second embodiment of the present invention, only the basic screen appears on the document itself, and the master screen is superposed on it by the human operator or the apparatus which visually or optically validates the authenticity of the document. In a third embodiment of this invention, the master screen is a sheet of microlenses (hereinafter: "microlens structure"). An advantage of this third embodiment is that it applies equally well to both transparent support, where the moire is observed by transmittance, and to opaque support, where the moire is observed by reflection. (The term "opaque support" as employed in the present disclosure also includes the case of transparent materials which have been made opaque by an inking process or by a photographic or any other process.)

The fact that moire effects generated between superposed dot-screens are very sensitive to any microscopic variations in the screened layers makes any document protected according to the present invention practically impossible to counterfeit, and serves as a means to distinguish easily between a real document and a counterfeited one.

It should be noted that the dot-screens which appear on the document itself in accordance with the present invention may be printed on the document like any screened (halftoned) image, within the standard printing process, and therefore no additional cost is incurred in the document production.

Furthermore, the dot-screens printed on the document in accordance with the present invention need not be of a constant intensity level. On the contrary, they may include dots of gradually varying sizes and shapes, and they can be incorporated (or dissimulated) within any variable intensity halftoned image on the document (such as a portrait, landscape, or any decorative motif, which may be different from the motif generated by the moire effect in the superposition). To reflect this fact, the terms "basic screen" and "master screen" used hereinafter will also include cases where the basic screens (respectively: the master screens) are not constant and represent halftoned images. As is well known in the art, the dot sizes in halftoned images determine the intensity levels in the image: larger dots give darker intensity levels, while smaller dots give brighter intensity levels.

In the present disclosure different variants of the invention are described, some of which are intended to be used by the general public (hereinafter: "overt" features), while other variants can only be detected by the competent authorities or by automatic devices (hereinafter: "covert" features). In the latter case, the information carried by the basic screen is masked using any of a variety of techniques, as described by Amidror and Hersch in U.S. Pat. No. 5,995,638. The terms "basic screen" and "master screen" as employed in the present disclosure include, therefore, both overt and covert cases.

Also described in the present disclosure is the multichromatic case, in which the dot-screens used are multichromatic, thereby generating a multichromatic moire effect.

Throughout the present disclosure the terms "random screen", "random master screen", "random basic screen", "random pinhole screen", "random microlens array", etc. should be understood as screens, pinhole screens, microlens arrays, etc. whose individual elements are located arbitrarily, not in a periodic way. Their element locations can be determined in various different ways, including by random, pseudo-random, or deterministic methods, either directly or by applying perturbations on an underlying periodic lattice of element locations.

The terms "print" and "printing" refer throughout the present disclosure to any process for transferring an image onto a support, including by means of a lithographic, photolithographic, photographic, electrophotographic or any other process (for example: engraving, etching, perforating, embossing, ink jet, dye sublimation, etc.).

The disclosures [Amidror02], [Amidror00], U.S. patent application Ser. No. 08/410,767 filed Mar. 27, 1995 (Ostromoukhov, Hersch), now U.S. Pat. No. 6,198,545, granted Mar. 6, 2001, and U.S. patent application Ser. No. 09/477, 544 filed Jan. 4, 2000 (Ostromoukhov, Hersch) have certain information and content which may relate to the present invention and aid in understanding thereof.

BRIEF DESCRIPTION OF THE DRAWINGS

The invention will be further described, by way of example only, with reference to the accompanying figures, in which.

DETAILED DESCRIPTION

In U.S. Pat. No. 6,249,588 and its continuation-in-part U.S. Pat. No. 5,995,638 Amidror and Hersch disclosed methods for the authentication of documents by using the intensity profile of moire patterns. These methods are based on specially designed periodic structures (dot-screens, pinhole-screens, microlens structures), which generate in their superposition periodic moire intensity profiles of any preferred colors and shapes (such as letters, digits, the country emblem, etc.) whose size, location and orientation gradually vary as the superposed layers are rotated or shifted on top of each other.

In order to add further protection and to make counterfeiting even more difficult, the present inventor comes now to disclose new categories of moire based methods, in which the individual, specially designed dots of the basic screens and of the master screens are randomly positioned. As it will be explained later in this disclosure, such aperiodic screens are more difficult to generate and extremely hard to reverse engineer; furtheremore, they benefit from a built-in encryption due to the choice of the random number sequence being used. Hence, they offer higher security against counterfeiting than the previous disclosures.

It is therefore an aim of the present invention to show how we can use advantageously moire effects which result from the superposition of random or pseudorandom structures such as dot-screens. It should be noted that in the general case no moire effects result from the superposition of random structures. This fact is, indeed, used in color printing techniques based on random screens, where the overprinting of four (or even more) dot screens for the primary color inks (usually, cyan, magenta, yellow and black) does not generate perceptible moire effects as it does in the case of periodic dot screens. However, as it will be shown below, thanks to the present invention it becomes possible to synthesize random or pseudorandom screens which, in spite of being random in themselves, still generate when they are superposed on top of one another a single moire intensity profile with clearly visible and undistorted shape. In order to explain this surprising fact, the following mathematical background from [Amidror02] must be first introduced.

Superposition of Aperiodic Layers

Figure 1A:
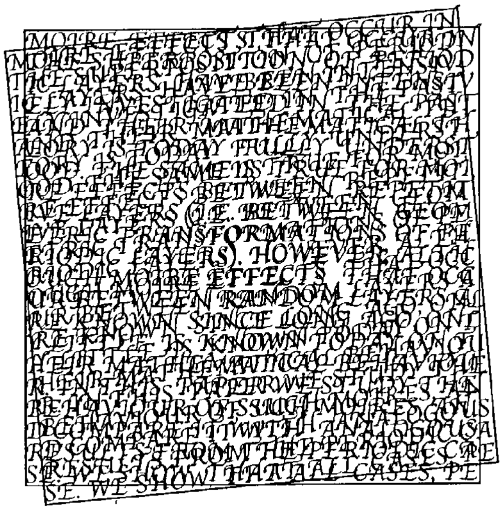
FIG. 1A (prior art) shows the superposition of two identical aperiodic layers with a small angle difference giving a moire effect in the form of a Glass pattern.
Figure 2A:
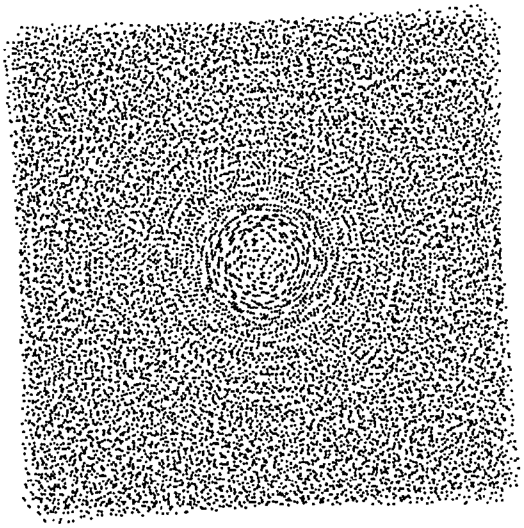
FIG. 2A (prior art) shows the superposition of two identical aperiodic dot screens with a small angle difference giving a moire effect in the form of a Glass pattern around the center of rotation.
Figure 2B:
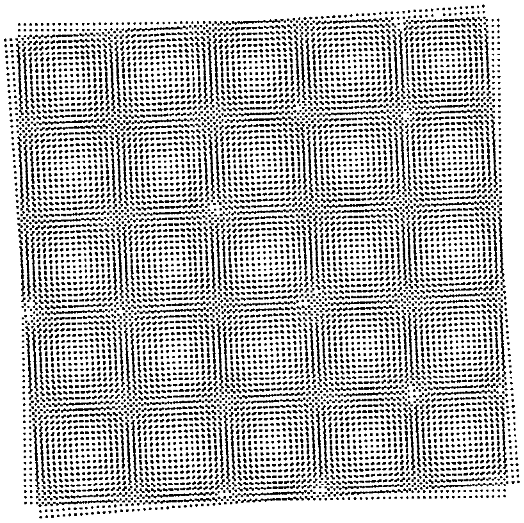
FIG. 2B (prior art) shows that when the superposed layers are periodic, a Glass pattern is still generated around the center of rotation, but due to the periodicity of the layers, this pattern is periodically repeated throughout the superposition, thus generating a periodic moire pattern.

It is a well-known fact that the superposition of periodic layers may give rise to new periodic structures which do not exist in any of the individual layers (see FIG. 2B). It is also known that the superposition of two identical random dot screens may give rise to a different type of moire pattern, inexistent in any of the individual layers, which consists of a single structure resembling a top-viewed funnel, or a distant galaxy in the night sky (see FIGS. 1A, 2A). This phenomenon is known in literature as a "Glass pattern", after the name of Leon Glass who described it in the late 1960s (L. Glass, "Moire effect from random dots," Nature, Vol. 223, August 1969, pp. 578–580).

Figure 1B:
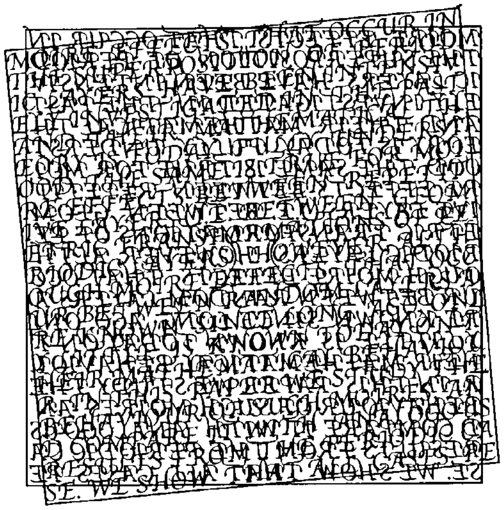
FIG. 1B (prior art) shows that when one of the aperiodic layers is turned face down on top of the other layer, the Glass pattern disappears.
Figure 2C:
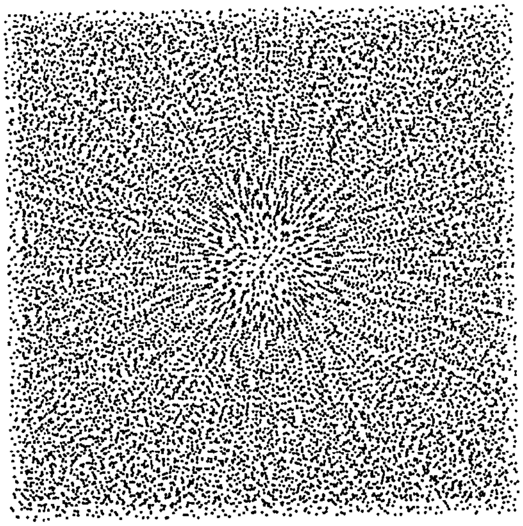
FIG. 2C (prior art) is the same as FIG. 2A but with a small scaling difference rather than angle difference between the two identical layers, thus giving rise in the microstructure to radial trajectories rather than concentric circular trajectories.
Figure 2D:
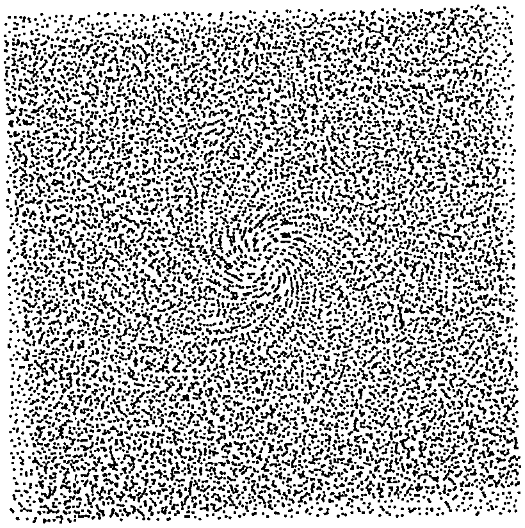
FIG. 2D (prior art) is the same as in FIG. 2A but with both a small angle and a small scaling difference between the two identical layers, thus giving rise in the microstructure to spiral trajectories.

As it can be seen in FIG. 2A, the Glass pattern is centered around a certain point in the superposition, and in contrary to periodic moires, it gradually decays and disappears farther away from this point. Depending on whether one of the superposed layers was rotated, scaled, or both, the Glass pattern gives rise to an intriguing ordering of the microstructure elements in the superposition in "trajectories" having a circular, radial or spiral shape (see FIGS. 2A, 2C, 2D). Other layer transformations may give rise to Glass patterns having elliptic, hyperbolic or other geometrically shaped trajectories (see: L. Glass and R. Pérez, "Perception of random dot interference patterns," Nature, Vol. 246, December 1973, pp. 360–362.). However, when we turn one of the superposed aperiodic layers face down on top of the other layer (this is easy to do when experimenting with transparencies; see FIG. 1B), the Glass pattern disappears as if by magic.

As already explained by Glass, this phenomenon occurs thanks to the local correlation between the structures of the two superposed layers; in fact, it can be used as a visual indication to the degree of correlation between the two layers in each point of the superposition, or for layer alignments (see U.S. Pat. No. 5,613,013). Thus, when two identical layers having the same arbitrary structure are slightly rotated on top of each other (see FIGS. 1A, 2A), a visible Glass pattern is generated around the center of rotation, indicating the high correlation between the two layers in this area: within the center of this Glass pattern the corresponding elements from both layers fall almost exactly on top of each other, but slightly away from the center they fall just next to each other, generating circular trajectories of point pairs. Further away from the center the correlation between the two layers becomes smaller and smaller, and the elements from both layers fall in an arbitrary, non-correlated manner; in this area the Glass pattern is no longer visible. This explains why the Glass pattern gradually decays and disappears as we go away from its center. Note, however, that when the two superposed layers are not at all correlated, no Glass pattern appears in the superposition (this is, indeed, what happens when we turn one of the aperiodic transparencies face down on top of its identical copy, as shown in FIG. 1B; this is also the case in color printing techniques based on random dot screens). In intermediate cases, where the two superposed layers are only partially correlated (for example, when one layer is a copy of the other with some percent of random noise being added), the Glass pattern becomes weaker and less perceptible, depending on the degree of the correlation which still remains between the superposed layers.

As we can see, the explanation above is based on an observation of the individual elements of the original layers and their behaviour in the superposition. We say, therefore, that this explanation is based on the microstructure. To obtain the point of view of the macrostructure, we have to look at the layers and their superposition from a bigger distance, where the individual elements of the layers are no longer discerned by the eye and what we see is only a gray level average of the microstructure in each area of the superposition. From the point of view of the macrostructure, the center of the Glass pattern consists of a brighter gray level than areas farther away, due to the partial overlapping of the microstructure elements of both layers in this area; farther away, elements from the two layers are more likely to fall side by side, thus increasing the covering rate and the macroscopic gray level. This means that the Glass pattern is not just an optical illusion, and it corresponds, indeed, to the physical reality. In fact, just like in the periodic case (see Proposition 8.1 in [Amidror00]), moire patterns are simply the macroscopic interpretation of the variations in the microstructures throughout the superposition.

The Fixed Point Theorem

A famous theorem in mathematical topology, known as the fixed point theorem (see, for example, "CRC Concise Encyclopedia of Mathematics" by E. W. Weisstein, CRC, Boca Raton, 1999, p. 653), says that any continuous function g(x) that maps the domain D=[a,b] onto itself: $g: [a,b]\rightarrow[a,b]$, has at least one fixed point in [a,b] (namely: a point $x_F\in[a,b]$ that is mapped by g(x) to itself: $g(x_F)=x_F$). This theorem is clearly illustrated in FIG. 11A.

Figure 11A:
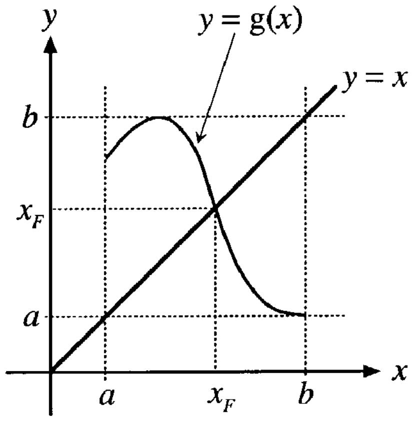
FIG. 11A shows, as an illustration of the fixed point theorem in the ID case, that any continuous function y=g(x) that maps a domain D=[a,b] onto itself crosses the diagonal y=x within the domain [a,b] at least once, and that at each such point $x_F$ we have, therefore, $g(x_F)=x_F$.

This fundamental theorem can be easily generalized to higher dimensions, although in such cases it can no longer be graphically illustrated as in FIG. 11A. For example, a 2D version of the fixed point theorem states that any continuous mapping g(x,y) that maps the disk $D=\{(x,y)|x^2+y^2\leqq r\}$ into itself has at least one fixed point in D, namely: a point $(x_F,y_F)\in D$ that is mapped by g(x,y) to itself: $g(x_F,y_F)=(x_F, y_F)$ (see, for example, "CRC Concise Encyclopedia of Mathematics" by E. W. Weisstein, CRC, Boca Raton, 1999, p. 176). This implies that for any surface z=r(x,y) on D that is transformed by such a continuous mapping (=coordinate transformation) g(x,y) there exists at least one point $(x_F,y_F)\in D$ for which $g(x_F,y_F)=(x_F,y_F)$, and hence $z_F=r(g(x_F,y_F))=r(x_F,y_F)$. Thus, the point $(x_F,y_F,z_F)$ belonging to the surface z=r(x,y) over the domain D remains unchanged, both in its location $x_F,y_F$ and in its value $z_F$, after applying the continuous mapping g(x,y) on the surface z=r(x,y). Moreover, because of the continuity of g(x,y), it follows that in the immediate neighborhood of the fixed point $(x_F,y_F)$ the influence of the mapping g(x,y) is small, meaning that for any point $(x_G,y_G)$ close to $(x_F,y_F)$ we have $g(x_G,y_G)\approx(x_G,y_G)$, original point $(x_G,y_G,z_G)$ of the surface $z=r(x,y)$ is only slightly displaced to $(x_G+\epsilon_x,y_G+\epsilon_y,z_G)$, where $z_G=r(x_G,y_G)=r(g(x_G+\epsilon_x,y_G+\epsilon_y))$.

Figure 11B:
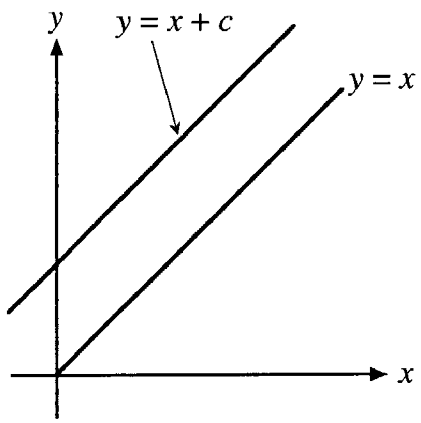
FIG. 11B shows that the fixed point theorem is not generally valid when D is the full range of $\mathbb{R}$.

It is interesting to note, however, that the fixed point theorem is not generally valid for infinite domains D such as $D=\mathbb{R}$, or, in the 2D case, $D=\mathbb{R}^2$ (the full x,y plane). In such cases the theorem still holds for many functions g, but there exist other functions g for which the theorem fails. This is illustrated, for the 1D case, in FIG. 11B: Although any function of the type $g(x)=x+c$ (with $c\neq0$) is continuous and fully maps $\mathbb{R}$ onto itself, there exist for these functions no fixed point $x_F\in\mathbb{R}$ such that $g(x_F)=x_F$ (unless we admit that parallel lines meet at infinity, in which case we may say that $x_F=\infty$ is a fixed point). However, other continuous functions that map $\mathbb{R}$ onto itself, such as $g(x)=x^3$, do have fixed points, since they do cross the diagonal $y=x$ at least at one point $x_F$. A similar situation exists also in the 2D case: while for many continuous mappings $g(x,y)$ from $\mathbb{R}^2$ onto itself, such as scalings or rotations, there exist a fixed point, for other mappings, such as translations: $g(x,y)=(x-a,y-b)$, there exist no fixed points (again, unless we consider infinity as a fixed point). However, the most important result for our needs may be formulated as follows:

The affine fixed point theorem: All non-degenerate affine mappings $g(x,y)$ from $\mathbb{R}^2$ onto itself have a single fixed point.

This theorem asserts that all mappings such as rotations, scalings, etc. as well as their combinations have, indeed, a fixed point; this also includes all of their combinations with translations, but pure translations are excluded. This theorem is explained and demonstrated in Appendix A of [Amidror02].

Let us see now how the fixed point theorem is related to our subject of interest, the superposition of similar structures, periodic or not. Suppose we are given a layer $r_1(x,y)$ consisting of an arbitrary structure. We generate a second, slightly modified layer $r_2(x,y)$ by applying on $r_1(x,y)$ a continuous mapping (coordinate transformation) $g(x,y)$ that maps the x,y plane $\mathbb{R}^2$ onto itself. For example, $r_2(x,y)$ could be a slightly rotated version of $r_1(x,y)$. We now superpose the two layers $r_1(x,y)$ and $r_2(x,y)$, for example by overprinting, or by laying their transparencies on top of each other. The superposition thus obtained is represented mathematically by the product:

$$r(x,y)=r_1(x,y)r_2(x,y) \qquad (1)$$

Suppose that the continuous mapping $g(x,y)$ has a fixed point $(x_F,y_F)$. This means that at the point $(x_F,y_F)$ we have $r_2(x_F,y_F)=r_1(g(x_F,y_F))=r_1(x_F,y_F)$, so that the point $(x_F,y_F,z_F)$ belonging to the surface $z=r_1(x,y)$ remains unchanged after applying the mapping $g(x,y)$: For example, if it was a black point, it remains a black point in $r_2(x,y)$, and if it was a white point, it remains a white point in $r_2(x,y)$. Furthermore, in the neighbourhood of this fixed point, any point $(x_G,y_G,z_G)$ of $r_1(x,y)$ has been only slightly displaced in $r_2(x,y)$. Let us see now how does this affect the superposition of Eq. (1).

Clearly, the superposition $r(x,y)$ is darker than each individual layer, since it becomes black wherever any of the superposed layers is black. However, the mean gray level of the superposition remains brighter in a close neighbourhood around the fixed point $(x_F,y_F)$, since in this area the black dots of $r_2(x,y)$ fall almost exactly on top of their original counterparts in $r_1(x,y)$, so that the mean gray level is only slightly darker than in $r_1(x,y)$. But as we go farther from the fixed point $(x_F,y_F)$, the correlation between the dots of $r_2(x,y)$ and the dots of $r_1(x,y)$ gradually decreases, and consequently the mean gray level of the superposition becomes darker, as the black points of $r_2(x,y)$ fall more often between black points of $r_1(x,y)$, leaving less white area in the superposition.

If the dots of $r_1(x,y)$ (and hence the dots of $r_2(x,y)$) are randomly distributed, then far away from the fixed point $(x_F,y_F)$ there will be no longer any correlation between the points of the two layers, and the resulting gray level in the superposition will remain constant as we go farther from $(x_F,y_F)$. However, if $r_1(x,y)$ is a periodic structure, such as a periodic dot screen, then as we go farther from the fixed point $(x_F,y_F)$ the mean gray level will periodically become darker and brighter, because zones of in-phase superposition, where elements of the two layers fall on top of each other, repeatedly alternate with zones of counter-phase superposition, where elements of the two layers fall between each other (compare FIGS. 2A and 2B). It is interesting to note that in the superposition of partly random layers, such as periodic dot screens with a certain degree of randomness being added, the resulting Glass patterns have, indeed, an intermediate look: Depending on the case, they still may have around the center oscillations between darker and brighter areas, but if the correlation between the layers decreases with the distance, these oscillations gradually fade out and disappear as we go farther from the center of the Glass pattern.

This correspondence between Glass patterns and periodic moires will be further developed in the next section; we will see that, in fact, periodic moires are simply a particular case of Glass patterns which occurs when the superposed layers are periodic.

The Behaviour of Glass Patterns and of Periodic Moires Under Layer Mappings

Having understood the mathematical meaning of Glass patterns, let us try to see their behaviour when any of the superposed layers undergoes a transformation such as rotation, scaling, translation, etc. Moreover, since the behaviour of periodic moires under such transformations is already fully known from the classical moire theory, it would be interesting to compare the behaviour of both cases, periodic and aperiodic, and to see if they follow the same mathematical rules.

(1) Behaviour Under Layer Rotations

The simplest nontrivial layer transformation consists of a rotation of any of the superposed layers. Suppose we have two identical layers consisting of the same arbitrary dot pattern, periodic or not. We superpose the two layers precisely on top of each other, and while keeping the first layer (say, the upper one) fixed, we slightly rotate the other one by a small angle $\alpha$, so that a Glass pattern becomes visible around the fixed point at the rotation center. As we have already seen, the center of the Glass pattern is brighter than areas further away, due to the partial overlapping of the black elements of both layers around the fixed point. This behaviour at the center is common to both periodic and random cases, and indeed, the difference between these cases becomes apparent only farther away from the fixed point: In a random case, as we go farther away from the fixed point the mean gray level of the superposition is stabilized at a certain darker level (see FIG. 2A), because farther from the center the correlation between the two layers becomes negligible. But in a periodic case (see FIG. 2B), the brighter gray level at the center becomes alternately darker and brighter as we go away from the fixed point, and it continues to oscillate periodically because zones of in-phase superposition, where elements of the two layers fall on top of each other, repeatedly alternate with zones of counter-phase superposition, where elements of the two layers fall between each other.

We may say, therefore, that the Glass pattern which is generated around the fixed point in a periodic case is periodic. However, from another point of view, we may formulate this result as follows:

Result 1: While in the random case there exists only one Glass pattern, which is located around the fixed point, in the periodic case, the Glass pattern which is generated around the fixed point is periodically repeated throughout the superposition.

From this point of view, the periods of a periodic moire pattern are simply duplicates of the main Glass pattern which is generated around the fixed point, and the period length of the moire corresponds to the distance between these duplicates. This does not mean, of course, that our rotation transformation g(x,y) has more fixed points when the two superposed layers are periodic than when the layers are aperiodic: obviously, in both cases g(x,y) has exactly one fixed point. But when the two superposed layers are periodic, we also have infinitely many points of coincidence between the two superposed layers, where the two layers happen to coincide because of the periodicity in their internal structure. But these points of coincidence are not fixed points of the underlying mapping g(x,y). We can say, therefore, that the fixed point of g(x,y) determines the main periodic tile of the moire, while all the other periodic tiles are only duplicates which exist due to the periodicity of the superposed layers.

Note, however, that in spite of all these differences between the Glass patterns in periodic and aperiodic superpositions, their fundamental behaviour under layer rotations remains basically the same: In both cases, when the angle $\alpha$ departs from 0, the Glass pattern (respectively: the periodic tile of the moire) becomes smaller and smaller until it completely disappears; and inversely, as the angle $\alpha$ tends to 0, the Glass pattern (respectively: the periodic tile of the moire) becomes bigger and bigger, until when $\alpha$ reaches 0 we obtain a singular superposition with an infinitely big moire, which is no longer visible.

(2) Behaviour Under Layer Scalings

A similar effect occurs also in the case of a scaling transformation. Suppose we have two identical layers consisting of the same arbitrary dot pattern, periodic or not. We superpose the two layers precisely on top of each other, and while keeping the first layer fixed, we slightly scale the other one (see FIG. 2C). Once again, a Glass pattern will become visible around the fixed point, whose center is brighter than areas farther away, due to the partial overlapping of the black elements of both layers around the fixed point. Although the microstructure obtained in this case is different than in the case of layer rotations (it consists of radial rather than circular dot trajectories; compare FIGS. 2C and 2A), the macroscopic properties of the Glass pattern remain the same. And again, while in the random case as we go farther from the fixed point the mean gray level of the superposition is stabilized at a certain darker level, in the periodic case as we go farther from the fixed point the brighter gray level at the center alternately becomes darker and brighter, and it continues oscillating repeatedly as the elements of the two layers periodically fall on top of each other (in phase) or between each other (in counter phase).

Thus, once again, according to Result 1, while in the random case there exists only one Glass pattern, which is located around the fixed point, in the periodic case, the Glass pattern which is generated around the fixed point is periodically repeated throughout the superposition.

But just as we have seen with layer rotations, in spite of the difference between the Glass patterns in periodic and aperiodic superpositions, their fundamental behaviour under layer scalings remains basically the same: In both cases, when the scaling factor s gradually departs from 1, the Glass pattern (respectively: the periodic tile of the moire) becomes smaller and smaller; and inversely, as the scaling factor s tends to 1, the Glass pattern (respectively: the periodic tile of the moire) becomes bigger and bigger, until when s reaches 1 we obtain a singular superposition with an infinitely big moire, which is no longer visible. It should be mentioned, however, that while in the periodic case new higher-order moires may occur around s=2, 3, or s=½, ⅓, etc., in the purely random case no higher order moires exist, since at such scaling values no correlation exists between the superposed layers (for instance, a random screen r(x,y) is not correlated with r(2x,2y)).

Glass Patterns as Moire Intensity Profiles

In all of the cases we have seen until now, the two superposed random layers were either identical, or slightly transformed (scaled, rotated or translated) copies of each other. This was required, or at least believed to be required, in order to guarantee the correlation between the two superposed layers, which is a necessary condition for the generation of a Glass pattern.

However, as disclosed in the present invention, it comes out that it is not required to have in both random layers identical or almost identical dot shapes in order to generate a Glass pattern in the superposition; in fact, all that is needed is that the random dot locations be identical (or slightly transformed) in both layers. Thus, if each dot screen consists of dots of a different shape, but the random number sequence being used to determine the x and y coordinates of each dot is the same in both layers, the superposition of the two layers will give a clearly visible Glass pattern.

Figure 3:
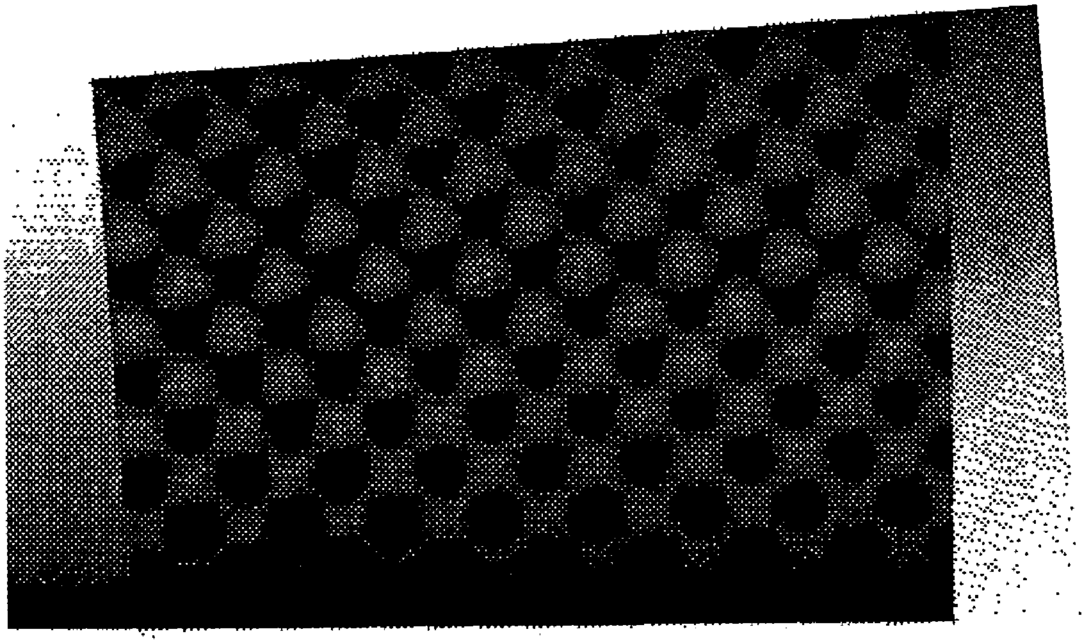
FIG. 3 (prior art) shows the moire intensity profiles obtained in the superposition of two dot-screens with a constant dot frequency, the first dot-screen comprising circular black dots of varying sizes and the second dot-screen comprising triangular black dots of varying sizes.
Figure 4:
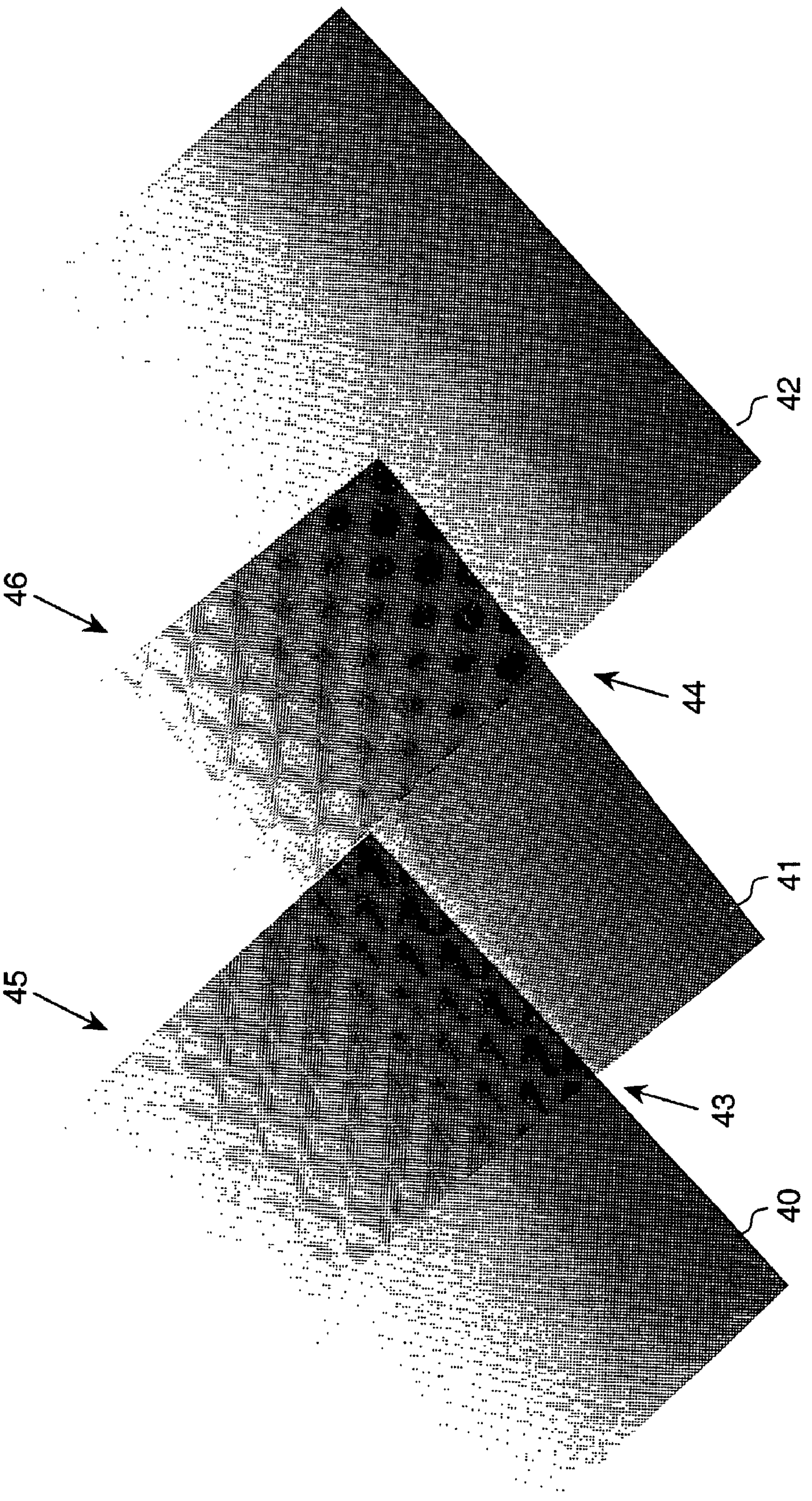
FIG. 4 (prior art) shows the moire intensity profiles obtained in the superposition of three dot-screens with a constant dot frequency, two of which (40, 42) comprising circular black dots of varying sizes and one (41) comprising black dots of varying sizes having the shape of the digit “1”

Hence, according to the present invention, it is possible to use in the layer superposition a random basic screen, consisting of dots of any desired shapes (such as the digit "1"), and a random master screen, consisting of tiny pinholes, provided that the random dot locations in both screens will be identical (or slightly transformed). In this case, just as it happens in the superposition of periodic layers (see FIGS. 3–5), the moire intensity profile which appears in the superposition will be a magnified and rotated version of the shape of the individual dots of the basic screen. The magnification rate and the orientation of this moire intensity profile vary according to the angle difference a between the two superposed layers, just as in the periodic case. But unlike in the periodic case, the moire intensity profile generated in the random case is not periodic, and it consists of only one copy of the magnified dot shape (see FIG. 14).

This surprising result seems at first to contradict the properties of Glass patterns, as generally known until now. As described at the end of the section "Superposition of aperiodic layers" above, the Glass pattern is brighter in its center than in areas farther away, due to the partial overlapping of the dots of both layers in this area. Farther away, elements from the two layers are more likely to fall side by side, thus increasing the covering rate and the macroscopic gray lavel. But the Glass pattern of FIG. 14 seems to completely contradict these facts.

In reality, however, there is no contradiction at all. The key point is that in "classical" Glass patterns, as known before the present invention, the master screen was identical (or almost identical) to the basic screen, and hence, it consisted of black dots on a white background. But if, as disclosed in the present invention, the random master screen consists of tiny pinholes on a black background, the convolution of the dot shape of one layer with the dot shape of the other layer gives, indeed, a Glass pattern (in our terms: a single moire intensity profile) consisting of a magnified and rotated version of the individual dot shape of the random basic screen (in the present example: a black "1"-shaped structure). This is similar to the situation in "Case 1" of periodic superpositions (see [Amidror00 p. 97]), namely: where the periodic master screen consists of tiny pinholes on a black background (see 43 in FIG. 4), except that the moire intensity profile in the present invention comprises only one copy of this magnified "1"-shaped structure. Similarly, if we replace our random master screen by an inverse-video copy of itself, consisting of tiny black dots on a white (or rather transparent) background, the convolution of the individual dot shapes of both layers basically gives an inverse-video version of the result in Case 1. Hence, if the random master screen contains tiny black dots, the moire intensity profile we obtain is a magnified version of the individual dot shape of the random basic screen, but this time in inverse video. In our example, we will obtain a single "1"-shaped Glass pattern which is brighter inside the digit shape and darker outside. This is similar to the situation in "Case 2" of periodic superpositions (see [Amidror00 p. 98]), namely: where the periodic master screen consists of tiny black dots (see 46 in FIG. 4), except that the moire intensity profile in the present invention comprises only one copy of this magnified inverse video "1"-shaped structure.

Finally, just as in "Case 3" in periodic superpositions (see [Amidror00 p. 99]), when none of the superposed layers consists of tiny dots (either white or black), the intensity profile form of the resulting moire (or Glass pattern) is still a magnified version of the convolution of the individual dot shapes of both layers. This convolution gives some kind of blending between the two original dot shapes, but the resulting shape has a blurred or smoothed appearance resembling a 2D Gaussian, with no recognizable shape. As we can now understand, this is exactly what happens in "classical" Glass patterns, where the two superposed layers are identical (or where their dot shapes are arbitrary). This is also the reason for which before the present invention no Glass pattern has been generated having the shape of a magnified version of an element which is randomly repeated in one of the superposed layers.

It should be noted that the individual dots of the random dot screens being used in the present invention consist, in fact, of randomly located pixel clusters, and not of randomly located individual device pixels. Each screen dot is composed of several device pixels which make up together the desired dot shape which is used to generate the random screen. This can be illustrated using the following example.

EXAMPLE 1

Figure 12A:
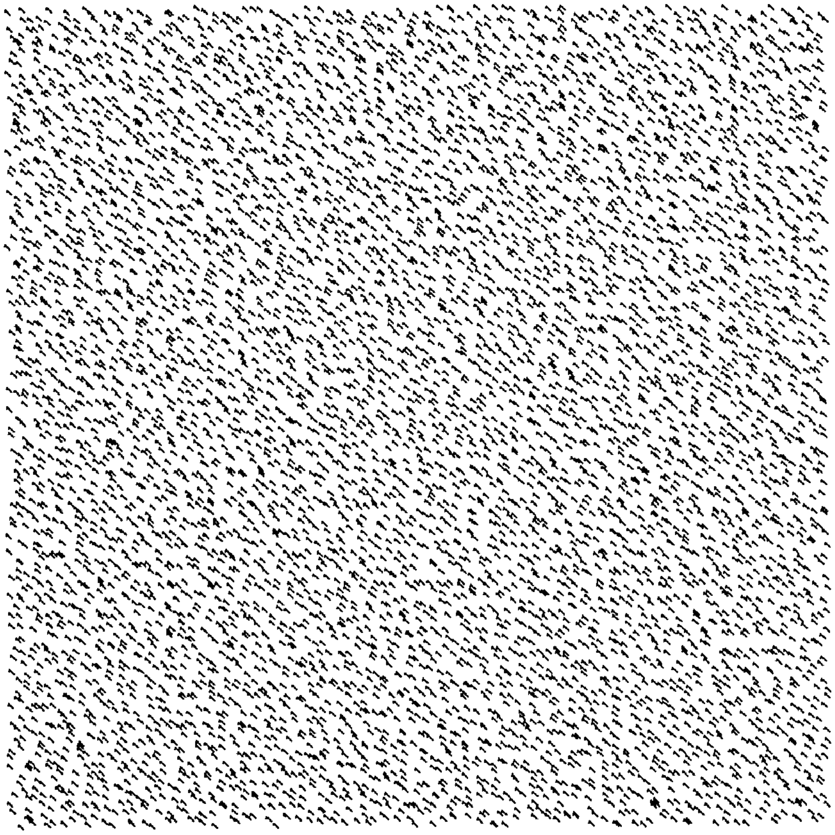
FIG. 12A shows a random basic screen according to one possible embodiment of the present disclosure.
Figure 12B:
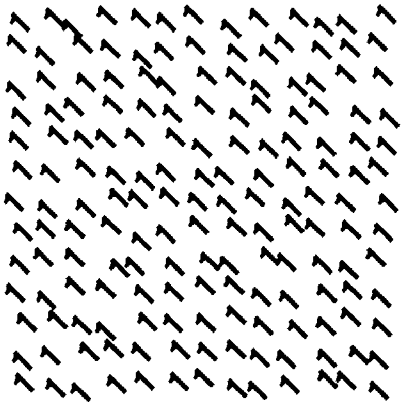
FIG. 12B shows a magnified view of a small portion of FIG. 12A.
Figure 13A:
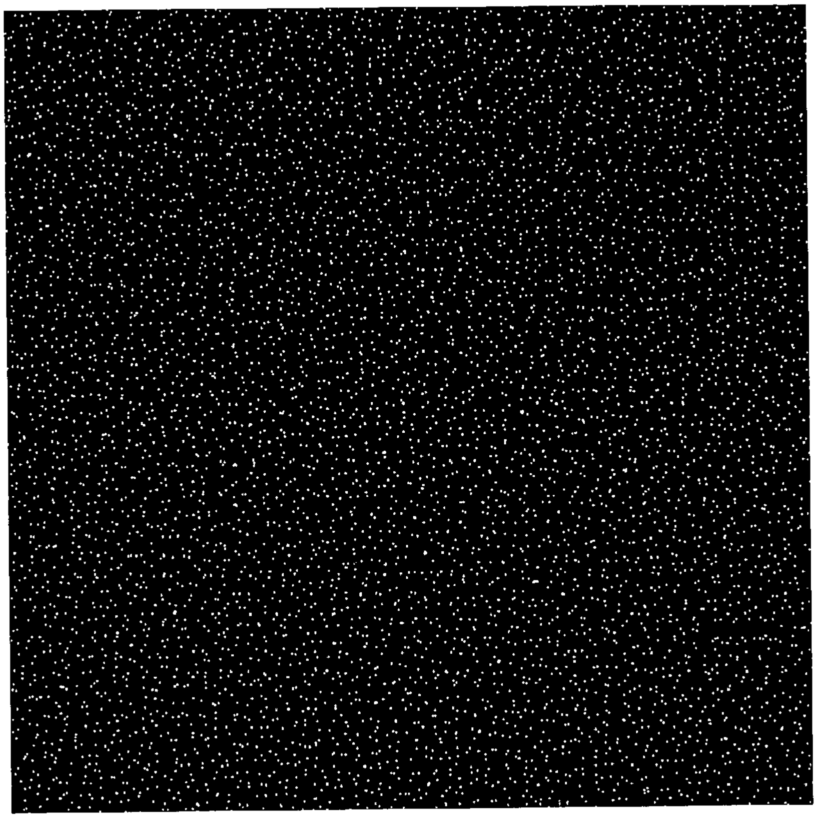
FIG. 13A shows a random master screen according to one possible embodiment of the present disclosure.
Figure 13B:
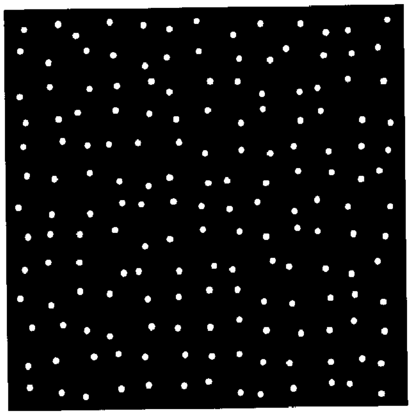
FIG. 13B shows a magnified view of a small portion of FIG. 13A.

A single moire intensity profile which is generated by the superposition of two random dot-screens on top of each other:

Let $r_1(x,y)$ be a random basic screen whose individual dots have the shape of the digit "1" as shown in FIGS. 12A and 12B, and let $r_2(x,y)$ be the corresponding random master screen whose individual dots are tiny pinholes with the same coordinates as the randomly located dots of the basic screen (FIGS. 13A and 13B).

In one preferred embodiment, the random locations of the screen dots are generated by a sequence of random numbers, that are obtained, as widely known in the art, by a random number generator. The random numbers thus obtained are first normalized to fall within the given dimensions of the screen, and then they are used as x and y coordinates for the locations of the dots of our basic and master screens. In a second preferred embodiment, the random numbers are not used as the coordinates themselves, but they are normalized to a small symmetric interval such as [−1,1] and used as $\Delta x$ and $\Delta y$ values which perturb the dot locations of an underlying periodic dot screen. In both cases, the same random numbers must be used for the corresponding dot locations in the basic and master screens. Thus, if the random number generator is used twice, once for generating the basic screen and then for generating the master screen, the same seed must be used in both cases in order to guarantee that the same sequence of random numbers will be generated in both cases.

Figure 5A:
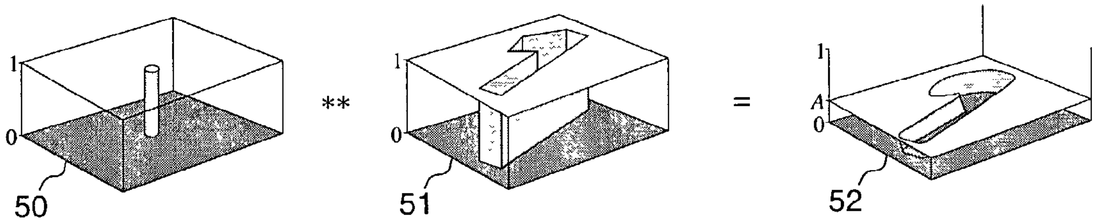
FIG. 5A illustrates how the convolution of tiny white dots (or holes) from one dot-screen with dots of a chosen shape from a second dot-screen gives moire intensity profiles of essentially the same chosen shape.
Figure 5B:
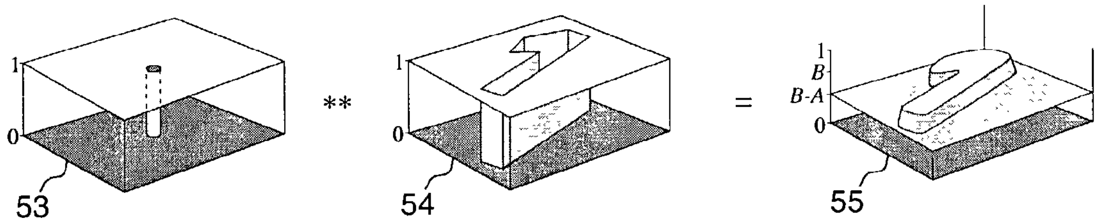
FIG. 5B illustrates how the convolution of tiny black dots from one dot-screen with dots of a chosen shape from a second dot-screen gives moire intensity profiles of essentially the same chosen shape, but in inverse video.
Figure 14:
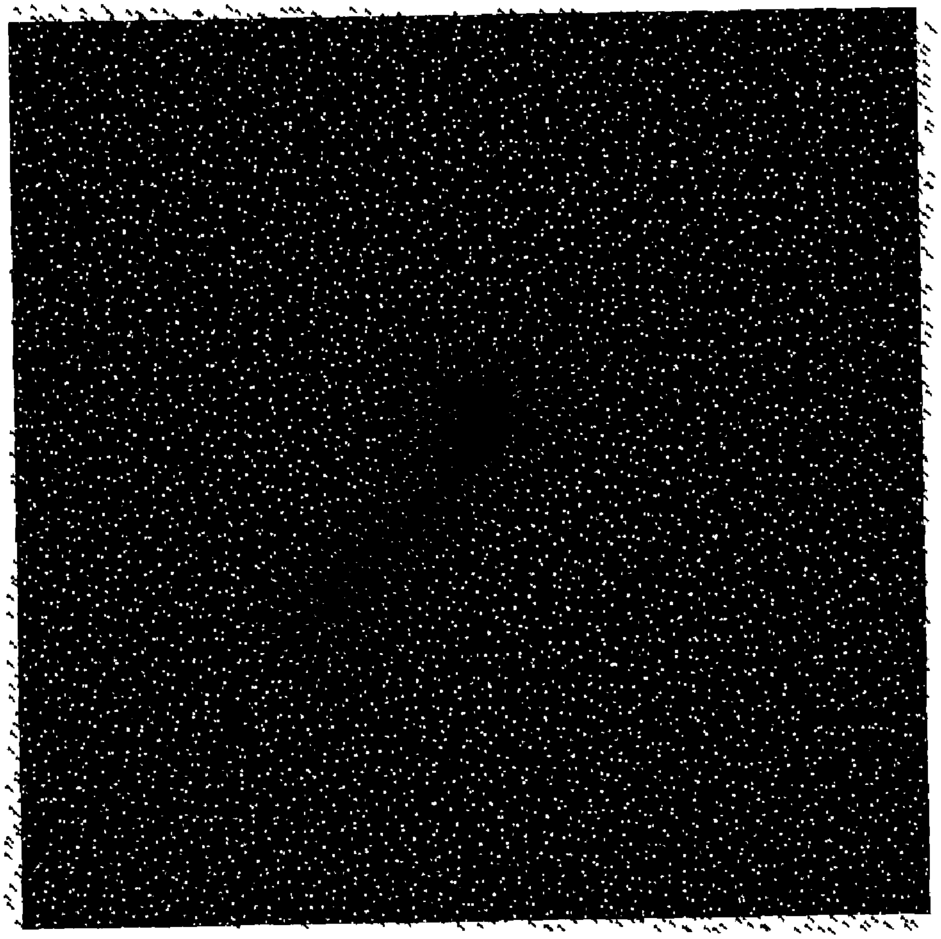
FIG. 14 shows that a superposition of the random master screen of FIG. 13 and the random basic screen of FIG. 12 gives a single “1”-shaped moire intensity profile.
Figure 15:
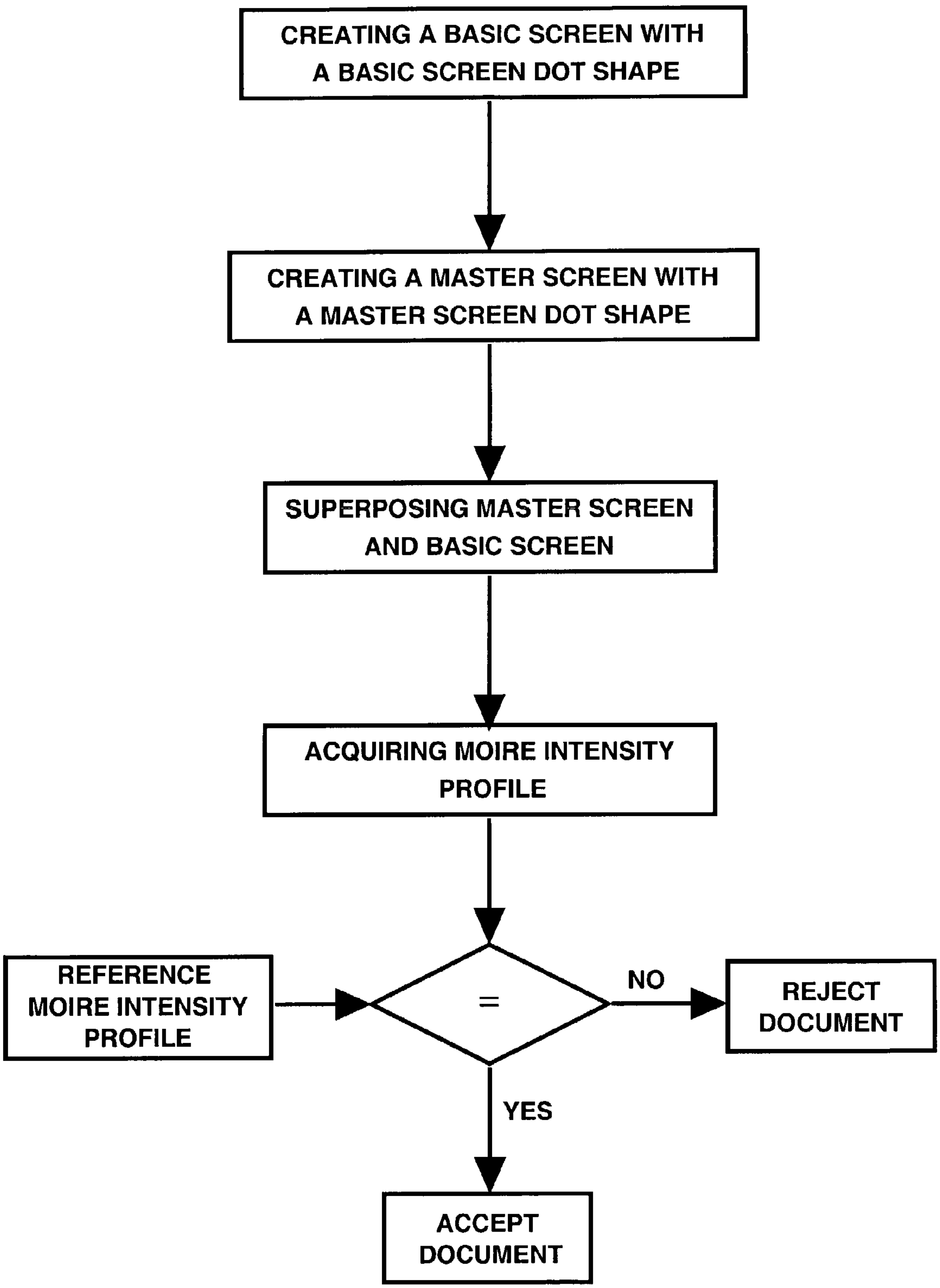
FIG. 15 shows a block diagram with the steps of methods of the invention summarized therein.

Now, if we superpose the random master and basic screens thus obtained on top of each other, we obtain in the superposition a single moire intensity profile whose shape is a convolution of the shape of "1" with the pinhole, which gives again a "1"-shaped intensity profile (see FIG. 5A). We obtain therefore a moire intensity profile consisting of a single magnified digit "1", even though the two superposed screens are not periodic. This is illustrated in FIG. 14.

In a more general embodiment of the present invention, the coordinate transformations g(x,y) that are applied on the superposed layers as explained above is not necessarily an affine transformation (such as rotation, scaling, shifting, and their combinations). Indeed, the transformation g(x,y) may be more complex, for example, a non-linear transformation. The effect of such a non-linear transformation on the resulting moire intensity profile will depend, of course, on the nature of the transformation being used. For example, the application of such a non-linear transformation on one of the superposed layers (or the application of different transformations on each of the superposed layers) may result in non-linear magnification, rotation or translation of the resulting moire intensity profile when the superposed layers are rotated or translated on top of each other. In another example, the moire intensity profile will be shifted less and less as it approaches the borders of the screen, so that it never disappears beyond the border of the screen. Obviously, other types of non-linear transformations can be also designed, having various other properties as desired by the designers.

The protection offerred by the present invention is further enhanced by the fact that when the master screen is slightly moved (shifted or rotated) on top of the basic screen, the resulting moire intensity profile varies dynamically through the original image (for example, it may be scaled, rotated, shifted, or otherwise transformed, depending on the transformation g(x,y)), and it is clearly distinguished from any static pattern that is printed on the document.

Encryption as Built-In Feature of Random Dot Screens

A major advantage of the present invention is in its intrinsically incorporated encryption system due to the arbitrary choice of the random number sequences for the generation of the specially designed random dot screens that are used in this invention. As explained in the section "Glass patterns as moire intensity profiles" above, in order that the superposition of a random master screen and a random basic screen gives a moire intensity profile (or a Glass pattern), it is required that the random dot locations be identical (or slightly transformed) in both layers. Thus, if each dot screen consists of dots of a different shape, but the random number sequence being used to determine the x and y coordinates of each dot is the same in both layers, the superposition of the two layers will give a clearly visible Glass pattern. But if the dot locations in the superposed random screens are not generated with the same random number sequence (for example: if they are generated by different random number generators or with different seeds), the superposition of both random screens will not give rise to any Glass pattern or moire intensity profile. The reason is that when the two superposed layers are not correlated, no Glass pattern appears in the superposition (this is, indeed, what happens when we turn one of the aperiodic transparencies face down on top of its identical copy, as shown in FIG. 1B; this is also the case in color printing techniques based on random dot screens).

As a consequence, it is clear that given a document with a random basic screen, the regeneration or inverse engineering of a corresponding random master screen that will be able to reveal the moire intensity profile is only possible if the random number sequence being used for the generation of the random basic screen is known. This provides the present invention with a built-in encryption system due to the choice of the random number sequences. For example, the random basic screens and the random master screen may be generated using a random number sequence that is kept secret, thus preventing unauthorized production of a random master screen that can reveal the moire intensity profile when superposed on the random basic screen of the document. As a further example, if the random number sequence depends on the serial number of the document, or on any other parameter of the document (or series of documents), it becomes impossible for a potential counterfeiter to generate an appropriate master screen that will be able to reveal the moire intensity profile. This encryption may be further coupled with different covert variants of the basic screen, for example, variants where the basic screen is a masked basic screen, thereby offering a covert means of authentication and making the re-engineering of the basic screen of the document extremely difficult, as explained by Amidror and Hersch in U.S. Pat. No. 5,995,638.

Generation of Random Dot-Screens

Figure 6:
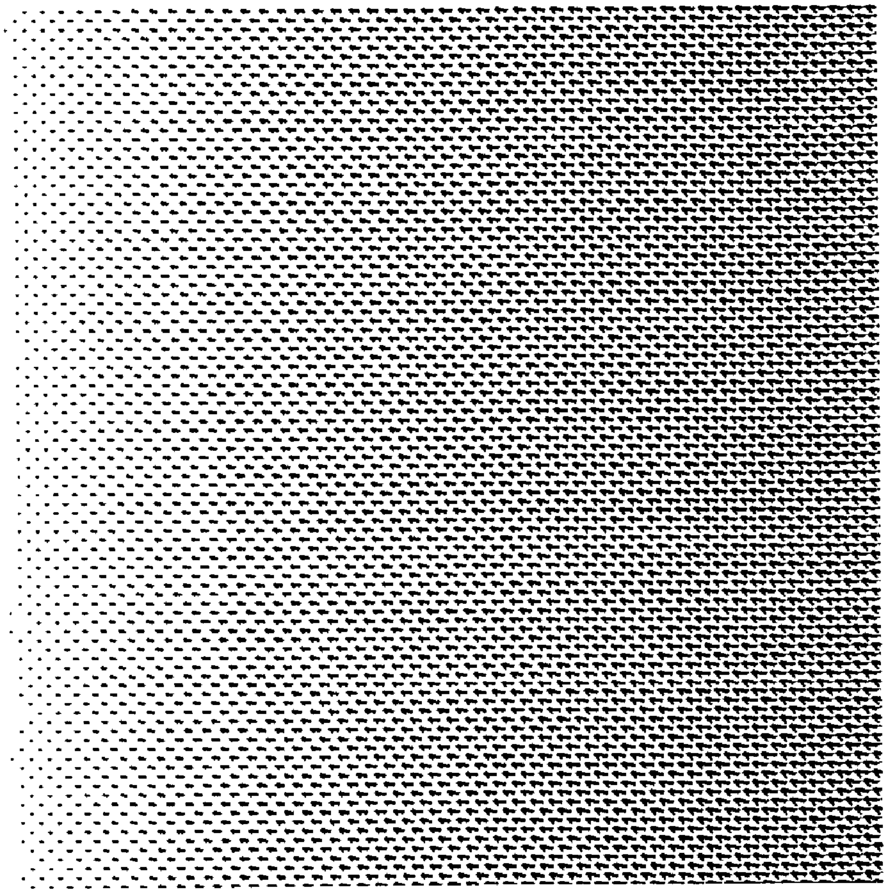
FIG. 6 shows a basic screen comprising black dots of varying sizes having the shape of the digit “1”
Figure 7A:
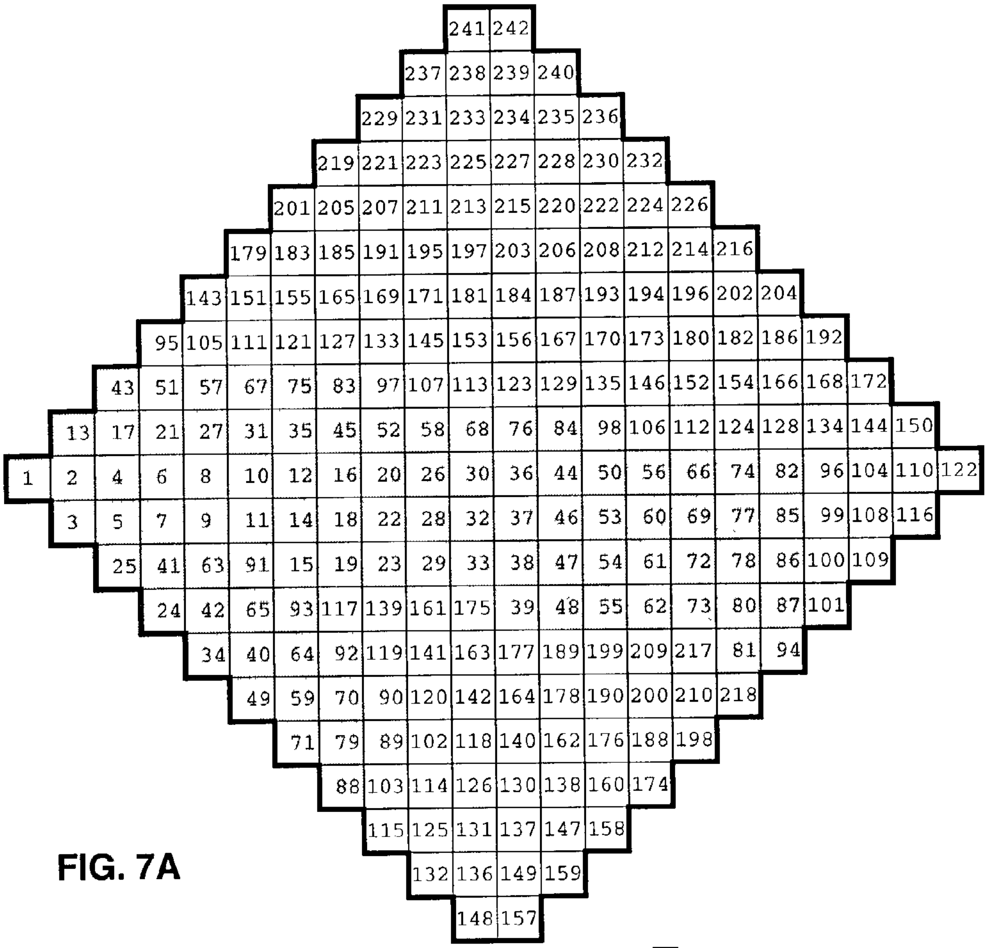
FIG. 7A shows the dither matrix used to generate the basic screen of FIG. 6.
Figure 7B:
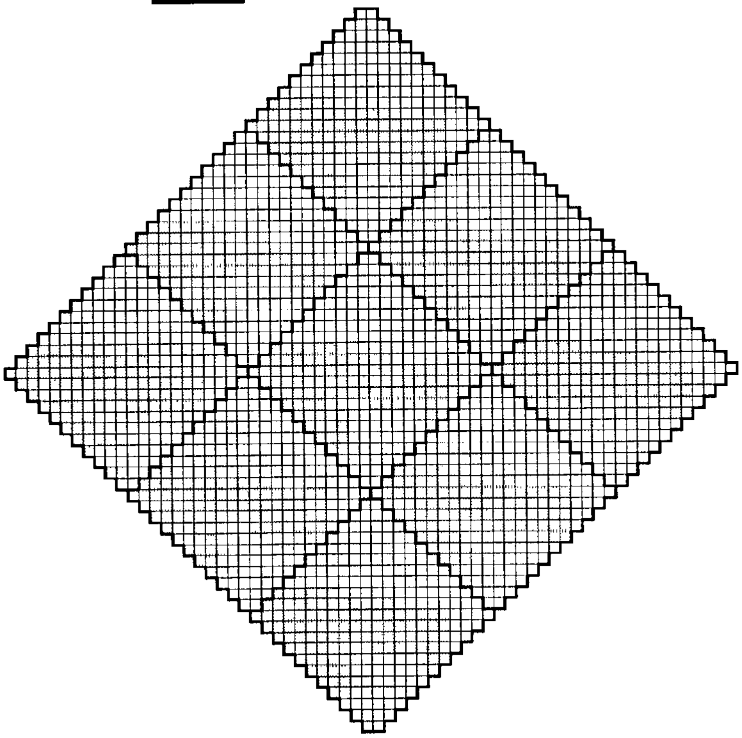
FIG. 7B is a greatly magnified view of a small portion of the basic screen of FIG. 6, showing how it is generated from the dither matrix of FIG. 7A.
Figure 16A:
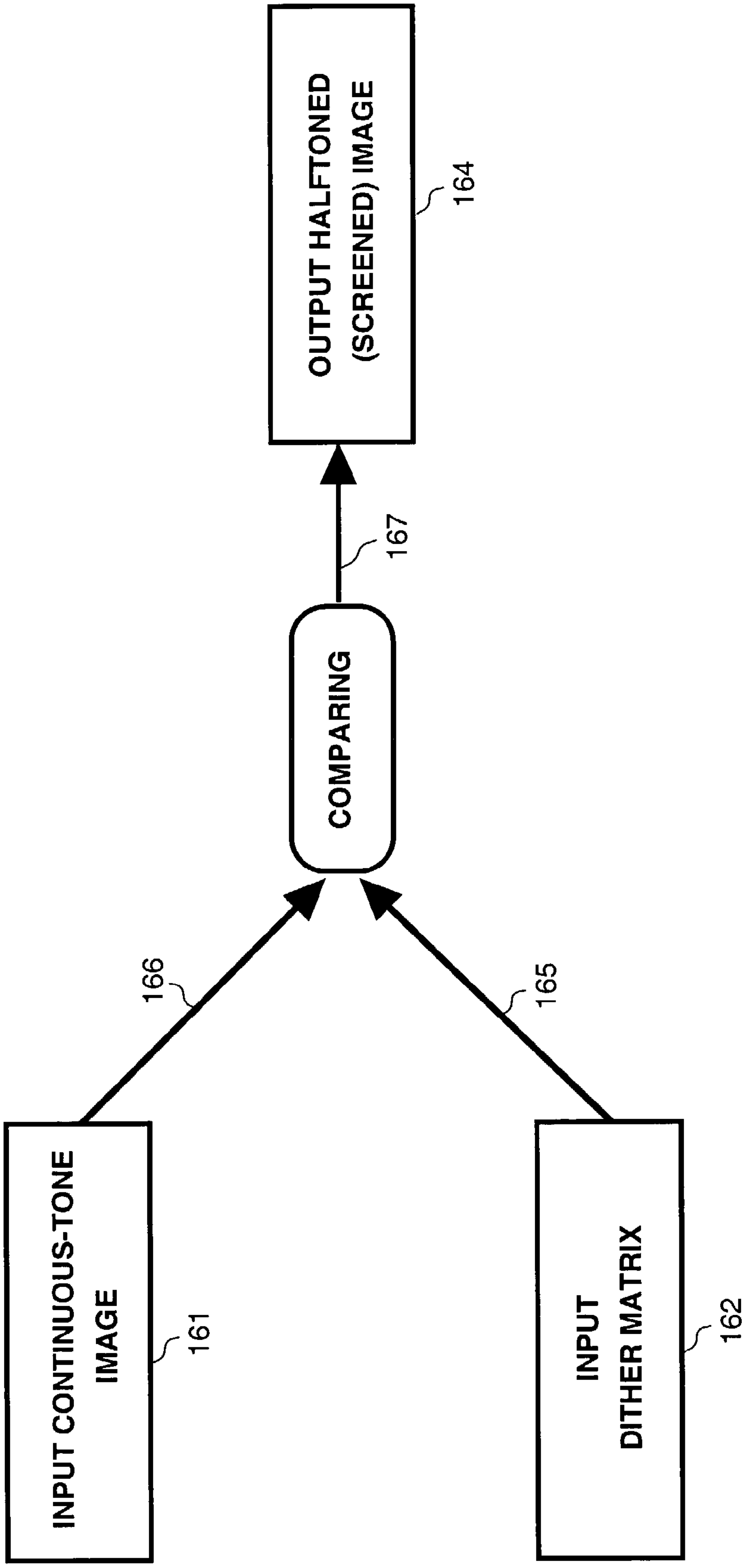
FIG. 16A shows a block diagram of the standard halftoning method by dithering (prior art)

In order to understand how random (and optionally also geometrically transformed) dot-screens can be generated, it may be helpful first to review the standard halftoning method by dithering which is well known in the prior art (see, for example, "Halftone images: spatial resolution and tone reproduction" by O. Bryngdahl, Journal of the Opt. Soc. of America, Vol. 68, 1978, pp. 416–422). This prior art method is schematically illustrated in the block diagram shown in FIG. 16A. In this method, we are given an input continuous-tone image 161, and an input dither matrix 162 which we virtually consider to be replicated periodically throughout the entire plane. The resulting halftoned (screened) image 164 will be generated in a destination bitmap whose dimensions, M×N pixels, are predetermined. The method consists of scanning the destination bitmap pixel by pixel, and for each pixel (x,y): (a) finding the corresponding location in the input continuous-tone image and its tone value T; (b) finding the corresponding location in the dither matrix and its value D; and (c) comparing the tone value T found in the continuous-tone image with the value D found in the dither matrix, and accordingly writing in the pixel (x,y) in the destination bitmap 1 (i.e. an inked pixel) if D>T or 0 (non-inked pixel) otherwise. Note that for the purpose of (b) we virtually consider the dither matrix to be periodically replicated throughout the entire plane; in practice, this is usually done without physically replicating the dither matrix, but rather by using modulo operations that cyclically wrap around any plane location backwards into the original dithering matrix (see, for example, p. 1510 in "Halftone patterns for arbitrary screen periodicities" by T. S. Rao and G. R. Arce, Journal of the Opt. Soc. of America A, Vol. 5, 1988, pp. 1502–1511). As an illustration, FIG. 7A shows the dither matrix that is used to generate the periodic basic screen with varying intensity levels shown in FIG. 6, whose screen dots have the shape of the digit "1". FIG. 7B shows a magnified view of a small portion of this basic screen, and how it is built by the dither matrix of FIG. 7A.

Figure 7C:
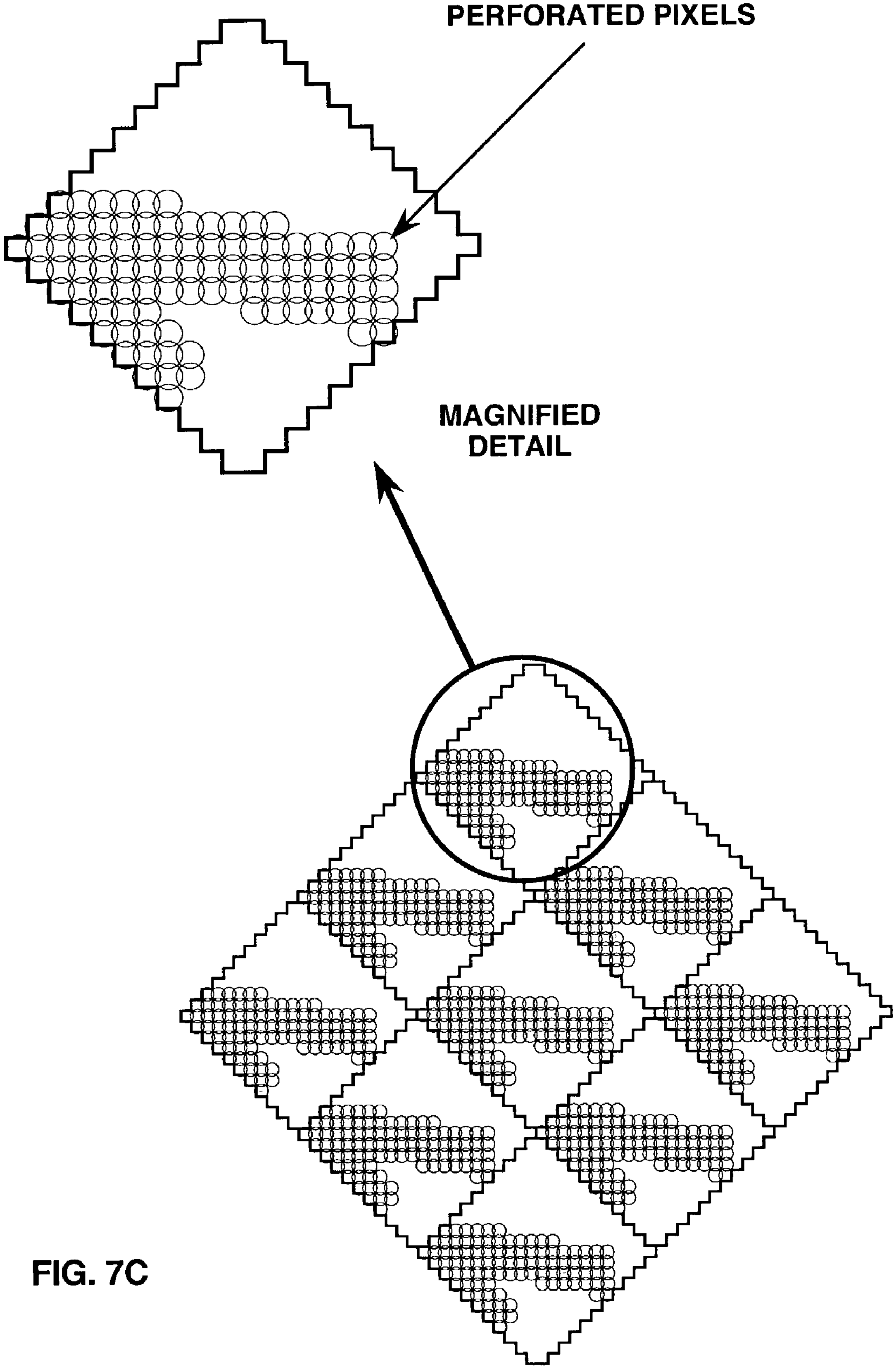
FIG. 7C is a greatly magnified view of a small portion of the basic screen of FIG. 6, showing how it can be generated from the dither matrix of FIG. 7A by microperforation.
Figure 7D:
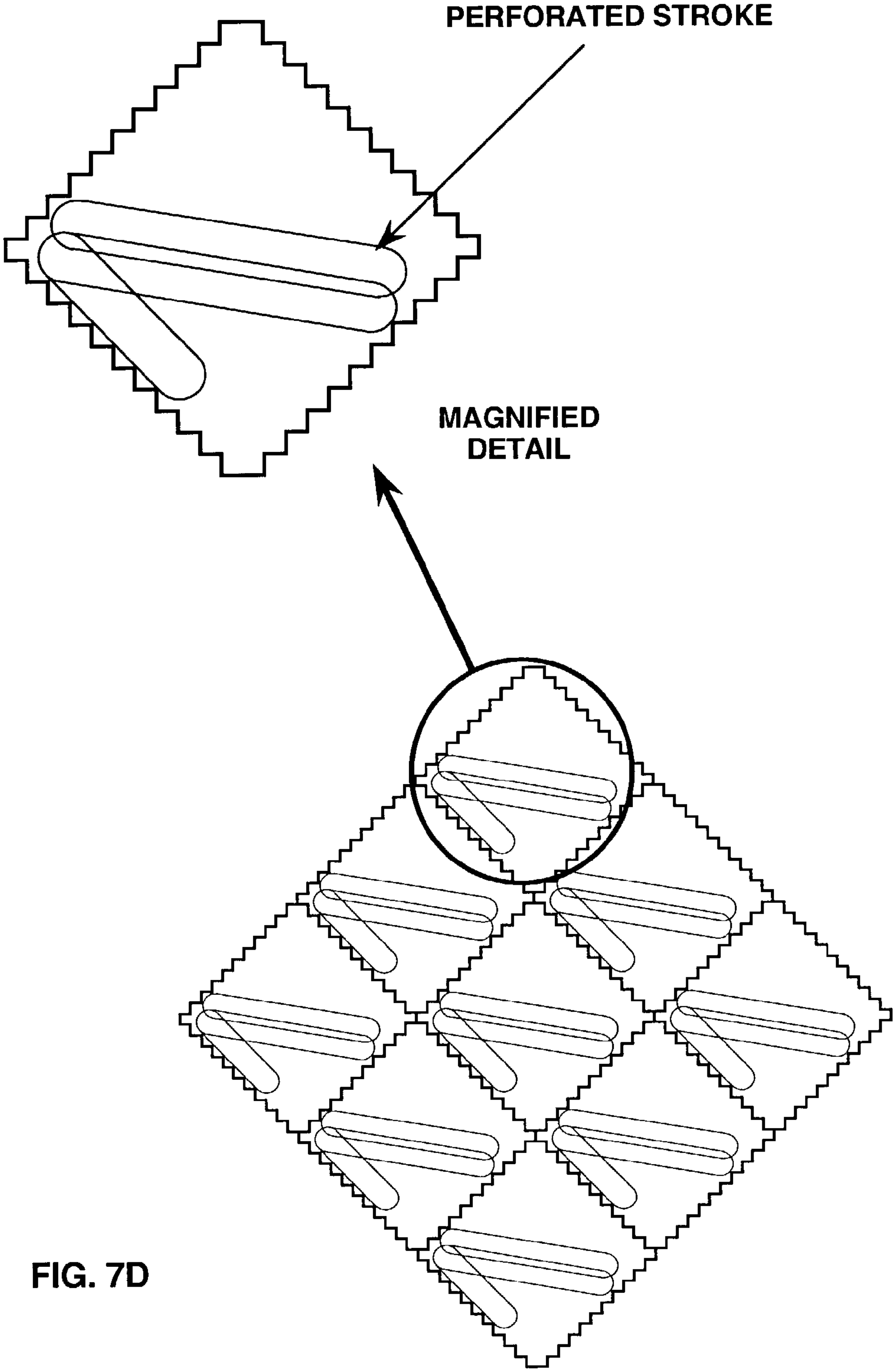
FIG. 7D shows an alternative way of generating the basic screen of FIG. 6 by microperforation.
Figure 8:
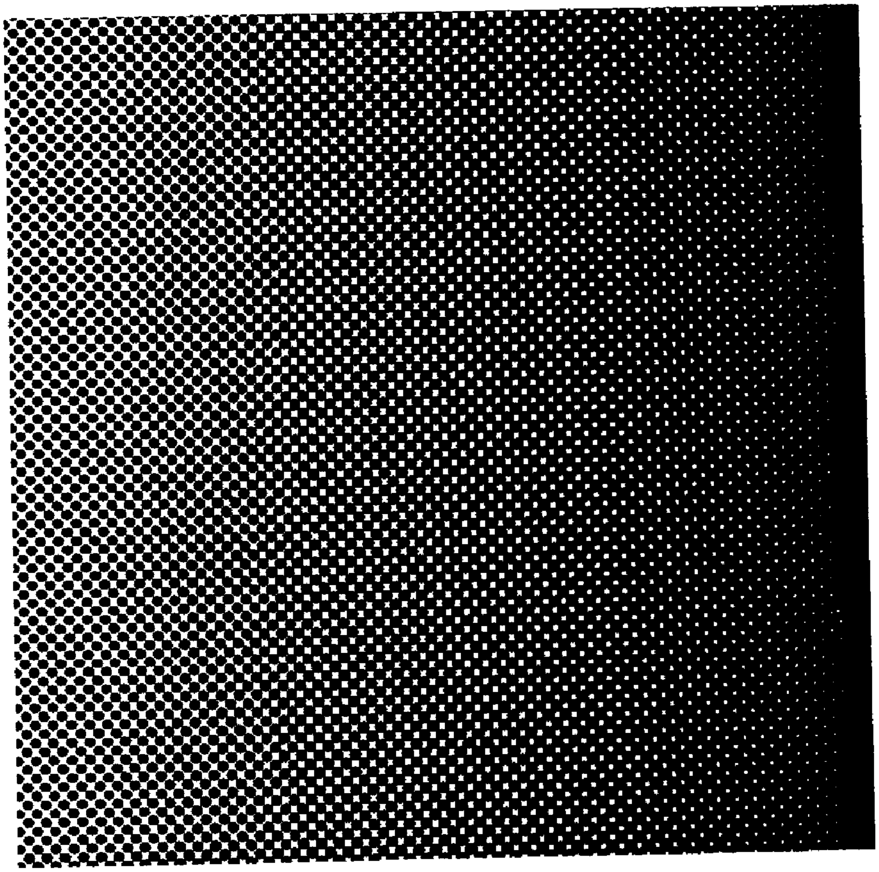
FIG. 8 shows a master screen comprising small white dots of varying sizes.
Figure 9A:
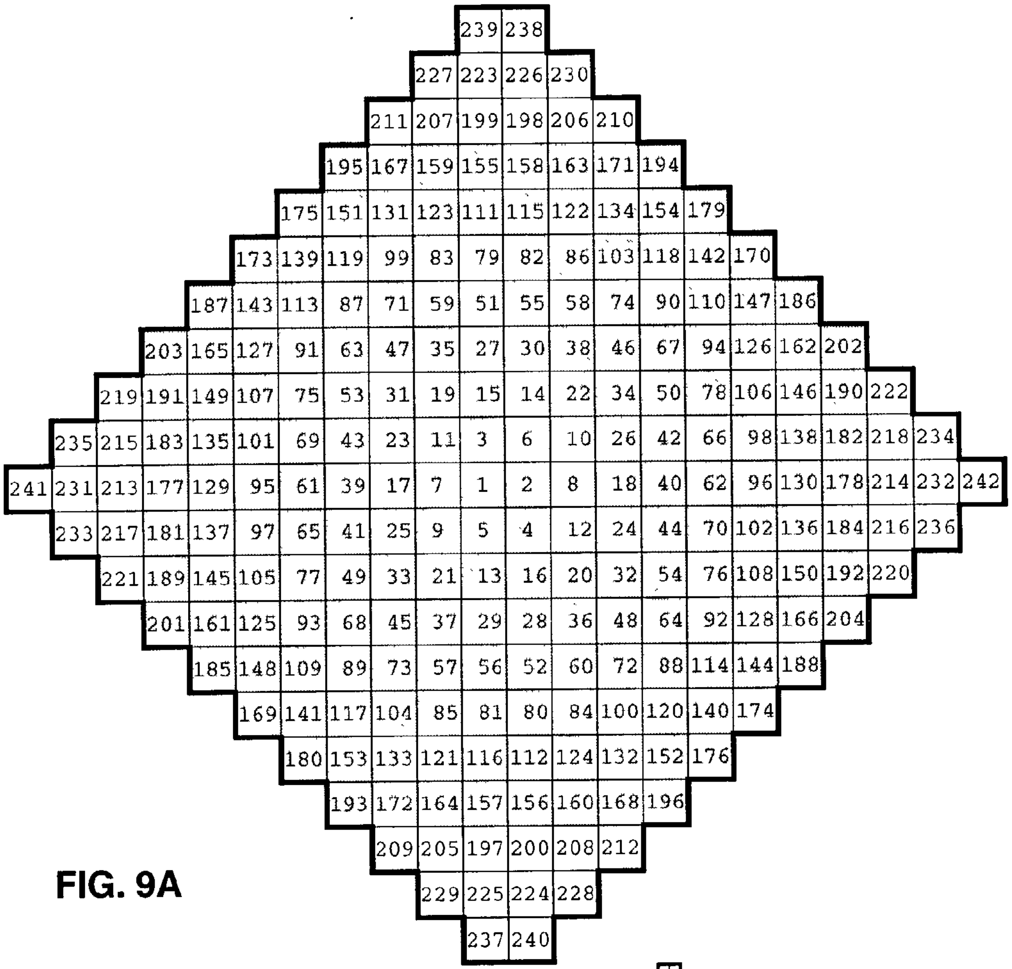
FIG. 9A shows the dither matrix used to generate the master screen of FIG. 8.
Figure 9B:
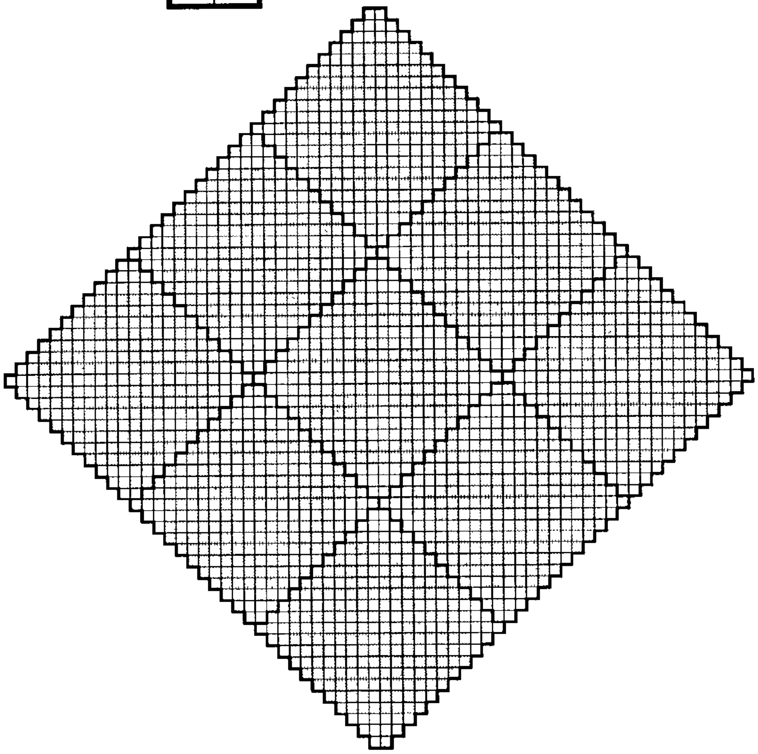
FIG. 9B is a greatly magnified view of a small portion of the master screen of FIG. 8, showing how it is generated from the dither matrix of FIG. 9A.

It should be noted that the dot screens (the master screen, the basic screen, or both) may be also obtained by perforation instead of by applying ink. In a typical case, a strong laser beam with a microscopic dot size (say, 50 microns or even less) scans the document pixel by pixel, while being modulated on and off, in order to perforate the substrate in predetermined pixel locations. Different laser microperforation systems for security documents have been described, for example, in "Application of laser technology to introduce security features on security documents in order to reduce counterfeiting" by W. Hospel, SPIE Vol. 3314, 1998, pp. 254–259. In cases where the dot screens are obtained by perforation rather than by applying ink, the generation of the dot screens is similar to the process described above, except that in step (c) "1" means a perforated pixel and "0" means a non perforated pixel (or, possibly, vice versa). This is illustrated in FIG. 7C, in which predetermined pixels are perforated (instead of being inked, as in the case of the corresponding FIG. 7B). It should be noted that laser microperforation systems may be also based on vector graphics instead of raster graphics; in such cases the laser beam does not scan the document pixel by pixel, line after line, but rather follows some predefined 2D trajectories (such as straight lines, arcs, etc.), just like a pen plotter, thus generating perforations of predefined forms on the document. Such systems can be equally well used for the generation of perforated dot screens, as illustrated in FIG. 7D.

In yet another category of methods, the dot screens (the master screen, the basic screen, or both) may be obtained by a complete or partial removal of the color layer, a coating layer, etc. at the screen dots, for example by laser or chemical etching.

Figure 16B:
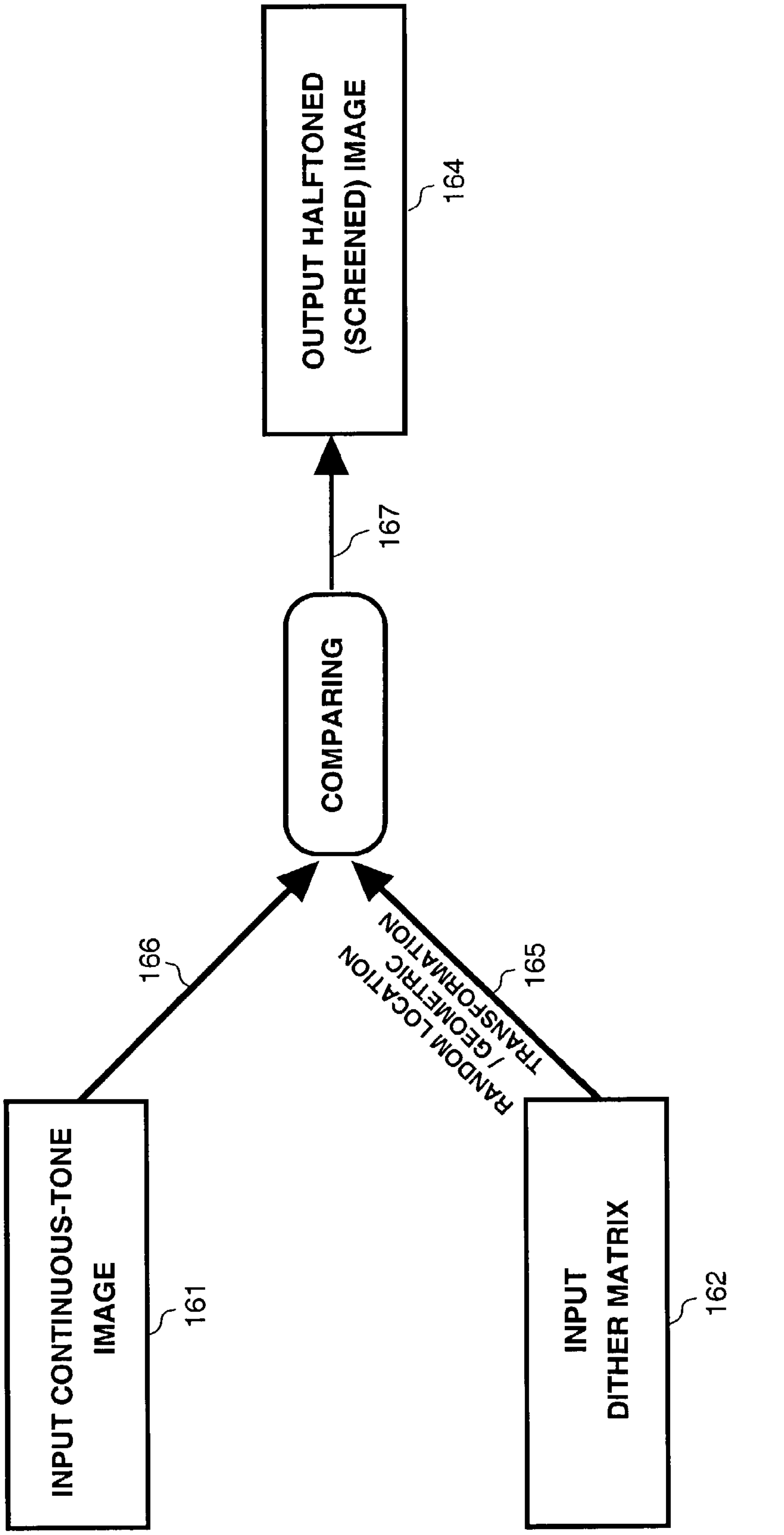
FIG. 16B shows a block diagram of a possible method for generating halftoned images having geometrically transformed dot-screens.

Now, in order to generate a halftoned image which is halftoned by a random (and optionally also geometrically transformed) dot-screen, all that we have to do is to add to the process described above a random number generating process, and optionally, a desired geometric transformation (morphing). This is illustrated in the block diagram shown in FIG. 16B. Note that in this block diagram the random and geometric transformations are applied at flow line 165, so that they only concern the halftone screen, but not the original input image, which remains in itself non-transformed.

Random (and optionally also geometrically) transformed dot-screens such as those used in the present disclosure may be therefore produced in practice in two steps. In the first step, an ordered dither matrix which defines the original, non-transformed dot shapes for all tone levels is generated, exactly as in the case of periodic dot-screens. In the second step, a dithering method as described for example in U.S. patent application Ser. No. 09/902,445 by Amidror and Hersch is used, except that the x and y coordinates for all pixels within an instance (replica) of the ordered dither matrix being used to cover the surface of the image are also dependent on a pair of random numbers $(x_R,y_R)$ belonging to the present instance of the ordered dither matrix. For example, the x and y coordinates of all the pixels belonging to the same instance of the ordered dither matrix are incremented by $x_R$ and $y_R$, respectively, in order that the dot generated by the dither matrix (in our example: a "1"-shaped dot) be shifted by $(x_R,y_R)$. Note that due to their random locations, shifted dots may also partially overlap. In a preferred embodiment, the screen transformation can be done on the fly where for each pixel (x,y) of the geometrically transformed dot-screen being generated in the destination bitmap its original location (x',y')=g(x,y) in the original, non-transformed screen is found, thus determining its value in the dither matrix exactly as in the standard, classical non-transformed case. In an alternative embodiment, the morphing and the randomization can be done by applying the transformation to the replication of the original dither matrix throughout the entire plane, and performing a standard dithering as described above using instead of the original dither matrix the transformation of the replicated dither matrix.

It should be noted that random and geometrically transformed dot-screens may be also generated in other ways, and the methods explained above are given only by way of example. Further possible ways for the generation of geometrically transformed dot-screens are explained in detail in U.S. patent application Ser. No. 08/410,767 filed Mar. 27, 1995 (Ostromoukhov, Hersch), now U.S. Pat. No. 6,198,545, granted Mar. 6, 2001, and in the paper "Artistic screening" by V. Ostromoukhov and R. D. Hersch, SIGGRAPH Annual Conference, 1995, pp. 219–228.

Authentication of Documents Using the Intensity Profile of Moire Patterns

The present invention concerns methods and devices for authenticating documents and valuable articles, which are based on the intensity profile of moire patterns. Although the present invention may have several embodiments and variants, three embodiments of particular interest are given here by the way of example, without limiting the scope of the invention to these particular embodiments. In one embodiment of the present invention, the moire intensity profiles can be visualized by superposing the basic screen and the master screen which both appear on two different areas of the same document (banknote, etc.). In a second embodiment of the present invention, only the basic screen appears on the document itself, and the master screen is superposed on it by the human operator or the apparatus which visually or optically validates the authenticity of the document. In a third embodiment of this invention, the master screen is a microlens structure. An advantage of this third embodiment is that it applies equally well to both transparent support (where the moire is observed by transmittance) and to opaque support (where the moire is observed by reflection). Since the document may be printed on traditional opaque support (such as white paper), this embodiment offers high security without requiring additional costs in the document production.

It should be noted, however, that the embodiments described above are given by way of example only, and they are by no means exhaustive. For example, other embodiments are possible where the roles of master screens and basic screens are interchanged, or where master screens and basic screens are both microlens structures (or pinhole arrays), and so forth.

The method for authenticating documents comprises the steps of:

a) creating on a document a basic screen with at least one basic screen dot shape;

b) superposing a master screen with a master screen dot shape and the basic screen, thereby producing a moire intensity profile;

c) comparing said moire intensity profile with a reference moire intensity profile, and depending on the result of the comparison, accepting or rejecting the document.

It should be mentioned that in the present invention both the basic screen and the master screen are random, and optionally, they may be also geometrically transformed. The resulting moire intensity profile is non-periodic and non-repetitive.

In some embodiments of this invention, a master screen or a basic screen may be made of a microlens structure. Microlens structures are composed of microlenses arranged for example on a square or a hexagonal grid (see, for example, "Microlens arrays" by Hutley et al., Physics World, July 1991, pp. 27–32), but they can be also arranged on any other geometrically transformed aperiodic or random grid. They have the particularity of enlarging on each grid element only a very small region of the underlying source image, and therefore they behave in a similar manner as screens comprising small white dots or pinholes. However, microlens structures have the advantage of letting most of the incident light pass through the structure. They can therefore be used for producing moire intensity profiles either by reflection or by transmission, and the document including the basic screen may be printed on any support, opaque or transparent. It should be noted that the role of microlens arrays in generating moire effects where a periodic microlens array is superposed on a periodic array of identical objects having the same pitch is known since long ago (see, for example, "New imaging functions of moire by fly's eye lenses" by O. Mikami, Japan Journal of Applied Physics, Vol. 14, 1975, pp. 417–418, and "New image-rotation using moire lenses" by O. Mikami, Japan Journal of Applied Physics, Vol. 14, 1975, pp. 1065–1066). But none of these known references disclosed an implementation of this phenomenon for document authentication and anti-counterfeiting. Furthermore, none of them has forseen, as the present inventor did, the possibility of using real halftoned images with full gray levels or colors as basic screens, or the possibility of using random microlens structures and random basic screens—neither for document authentication and anti-counterfeiting nor for any other purpose.

The comparison in step c) above can be done either by human biosystems (a human eye and brain), or by means of an apparatus described later in the present disclosure.

The reference moire intensity profile can be obtained either by image acquisition (for example by a camera) of the superposition of a sample basic screen and a master screen, or it can be obtained by precalculation. When the authentication is made by a human, the reference moire intensity profile may be also a memorized reference moire intensity profile, based on a previously seen reference moire intensity profile (such as a reference moire intensity profile which was previously seen in an official brochure published by the competent authorities, or a moire intensity profile seen previously in a superposition of a basic screen and a master screen in documents that are known to be authentic).

In the case where the basic screen is formed as a part of a halftoned image printed on the document, the basic screen will not be distinguishable by the naked eye from other areas on the document. However, when authenticating the document according to the present invention, the moire intensity profile will become immediatly apparent.

Any attempt to counterfeit a document produced in accordance with the present invention by photocopying, by means of a desk-top publishing system, by a photographic process, or by any other counterfeiting method, be it digital or analog, will inevitably influence (even if slightly) the size or the shape of the tiny screen dots of the basic (or master) screens comprised in the document (for example, due to dot-gain or ink-propagation, as is well known in the art). But since moire effects between superposed dot-screens are very sensitive to any microscopic variations in the screens, this makes any document protected according to the present invention practically impossible to counterfeit, and serves as a means to distinguish between a real document and a counterfeited one. Furthermore, unlike previously known moire-based anticounterfeiting methods, which are only effective against counterfeiting by digital equipment (digital scanners or photocopiers), the present invention is equally effective in the cases of analog or digital equipment.

The invention is elucidated by means of the Examples below which are provided in illustrative and non-limiting manner.

EXAMPLE I

Basic Screen and Master Screen on Same Document

Consider as a first example a document comprising a random basic screen with a basic screen dot shape of the digit “1” (like FIG. 12). A different area of the document comprises a random master screen, for example, with a master screen dot shape of small white pinholes (like FIG. 13), giving a dark intensity level. The document is printed on a transparent support.

In this example both the basic screen and the master screen are produced with the same random dot locations. The moire intensity profile which is obtained when the basic screen and the master screen are superposed has the form of the digit “1”, as shown in FIG. 14. As explained above, although the basic screen and the master screen are random, a clear moire intensity profile is produced in the superposition, and it has a good tolerance to both shifts and rotations.

It should be noted that the pinholes of the master scren and/or the dot shapes of the basic screen may be also obtained by perforation, for example by using mechanical or laser microperforation. In this case the dot or pinhole shapes can be obtained, for example, by means of a microscopic laser beam that is modulated on and off in order to perforate the substrate in predetermined points, as explained in detail earlier. Note that in order to obtain the best effect such microperforations should be applied to an opaque support, or to a transparent support with dark ink printed on it.

In another possible variant, the pinholes of the master screen and/or the dot shapes of the basic screen may be obtained by a complete or partial removal of the color layer or the coating layer, for example by laser or chemical etching.

EXAMPLE II

Basic Screen on Document and Master Screen on Separate Support

As an alternative to Example I, a document may contain a random basic screen, which is produced by screen dots of a chosen shape (possibly being incorporated in a halftoned image). The document is printed on a transparent support. The random master screen may be identical to the master screen described in Example I, but it is not located on the document itself but rather on a separate transparent support, and the document can be authenticated by superposing the basic screen of the document with the separate master screen. For example, the superposition moire may be visualized by laying the document on the master screen, which may be fixed on a transparent sheet of plastic and attached on the top of a box containing a diffuse light source.

Example III

Basic Screen on Document and Master Screen Made of a Microlens Structure

In the present example, the random master screen has the same form as in Example II, but it is made of a microlens structure. The random basic screen is as in Example II, but the document is printed on a reflective (opaque) support. In the case where the basic screen is formed as a part of a halftoned image printed on the document, the basic screen will not be distinguishable by the naked eye from other areas on the document. However, when authenticated under the microlens structure, the moire intensity profile will become immediatly apparent. Since the printing of the basic screen on the document is incorporated in the standard printing process, and since the document may be printed on traditional opaque support (such as white paper), this embodiment offers high security without requiring additional costs in the document production. This embodiment can be used in several different variants: For instance, the basic screen may be printed on an optical disk such as a CD or a DVD while the microlens structure is incorporated in its plastic box or envelope; or, in a different variant, the basic screen may be located on a document while the microlens structure is provided on a separate transparent support.

Various embodiments of the present invention can be used as security devices for the protection and authentication of multimedia products, including music, video, software products, etc. that are provided on optical disk media. Various embodiments of the present invention can be also used as security devices for the protection and authentication of other industrial packages, such as boxes for pharmaceutics, cosmetics, etc. For example, the box lid may contain the pinholes of the master screen, while the basic screen is located on a transparent part of the box; or, if the box is not transparent, a microlens structure can be used as a master screen. Packages that include a transparent part or a transparent window are very often used for selling a large variety of products, including, for example, audio and video cables, casettes, perfumes, etc., where the transparent part of the package enables customers see the product inside the package. However, transparent parts of a package may be also used advantageously for authentication and anticounterfeiting of the products, by using a part of the transparent window as a master screen (where the basic screen is located on the product itself), or as a basic screen (where the master screen is incorporated, for example, in the lid or provided on a separate transparent support), or in any other way in accordance with the present invention. It should be noted that the basic screen and the master screen can be also printed on separate security labels or stickers that are affixed or otherwise attached to the product itself or to the package. A few possible embodiments of packages which can be protected by the present invention are illustrated, by way of example, in U.S. patent application Ser. No. 09/902,445 (Amidror and Hersch) and in FIGS. 17–22 therein.

It should be noted that in all of the examples the basic and the master screens can be either overt or covert; in the latter case, the basic screen is a masked basic screen, meaning that the information carried by the basic screen is masked using any of a variety of techniques, for example as described by Amidror and Hersch in U.S. Pat. No. 5,995,638.

The Multichromatic Case

As previously mentioned, the present invention is not limited only to the monochromatic case; on the contrary, it may largely benefit from the use of different colors in any of the dot-screens being used, either periodic or aperiodic.

One way of using colored dot-screens in the present invention is similar to the standard multichromatic printing technique, where several (usually three or four) dot-screens of different colors (usually: cyan, magenta, yellow and black) are superposed in order to generate a full-color image by halftoning. However, as it is already known in the art, if the dot screens being used for the different colors are independent (i.e. non-correlated) random dot screens, no moire effects are generated between them, and the number of color screens may exceed the standard number of three or four. If one of these colored random dot-screens is used as a random basic screen according to the present invention, the moire intensity profile that will be generated with a corresponding black-and-white random master screen will closely approximate the color of the color basic screen. If several of the different colored dot-screens are used as basic screens according to the present invention, each of them will generate with an achromatic master screen a moire intensity profile approximating the color of the basic screen in question. The moire intensity profiles of the different colored basic screens may be revealed by the same random master screen (if all of the colored basic screens are generated with the same random number sequence), or by different random master screens (if a different random number sequence is used for each colored basic screen).

Another possible way of using colored dot-screens in the present invention is by using a basic screen whose individual screen elements are composed of sub-elements of different colors, as disclosed by Amidror and Hersch in their previous U.S. Pat. No. 5,995,638, also shown in FIGS. 14A–14C therein. An important advantage of this method as an anti-counterfeiting means is gained from the extreme difficulty in printing perfectly juxtaposed sub-elements of the screen dots, due to the high precision it requires between the different colors in multi-pass color printing. Only the best high-performance security printing equipment which is used for printing security documents such as banknotes is capable of giving the required precision in the alignment (hereinafter: "registration") of the different colors. Registration errors which are unavoidable when counterfeiting the document on lower-performance equipment will cause small shifts between the different colored sub-elements of the basic screen elements; such registration errors will be largely magnified by the moire effect, and they will significantly corrupt the form and the color of the moire profiles obtained by the master screen.

Hence, counterfeiters trying to counterfeit the color document by printing it using a standard printing process will also have, in addition to the problems of creating the basic screen, problems of color registration. Without correct color registration, the basic screen will incorporate distorted screen dots. Therefore, the intensity profile of the moire acquired with the master screen applied to a counterfeited document will clearly distinguish itself, in terms of form and intensity as well as in terms of color, from the moire profile obtained when applying the master screen to the non-counterfeited document. Since counterfeiters will always have color printers with less accuracy than the official bodies responsible for printing the original valuable documents (banknotes, checks, etc.), the disclosed authentication method remains valid even with the quality improvement of color reproduction technologies.

One possible way for printing color images using standard or non-standard color inks (standard or non-standard color separation) has been described in U.S. patent application Ser. No. 09/477,544 filed Jan. 4, 2000 (Ostromoukhov, Hersch) and in the paper "Multi-color and artistic dithering" by V. Ostromoukhov and R. D. Hersch, SIGGRAPH Annual Conference, 1999, pp. 425–432. This method, hereafter called "multicolor dithering", uses dither matrices similar to standard dithering, as described above, and provides for each pixel of the basic screen (the halftoned image) a means for selecting its color, i.e. the ink, ink combination or the background color to be assigned for that pixel. A random or geometric transformation can be then applied to this dither matrix in the same way as already explained above for monochromatic dithering. It should be noted, as explained in detail in the above mentioned references, that the multicolor dithering method ensures by construction that the contributing colors are printed side by side. This method is therefore ideal for high-end printing equipment that benefits from high registration accuracy, and that is capable of printing with non-standard inks, thus making the printed document very difficult to counterfeit, and easy to authenticate by means of the disclosed method, as explained above.

Apparatus for the Authentication of Documents Using the Intensity Profile of Moire Patterns An apparatus for the visual authentication of documents comprising a random basic screen may comprise a random master screen (such as a dot-screen, a pinhole screen, a microlens structure, etc.) prepared in accordance with the present disclosure, which is to be placed on the random basic screen of the document, while the document itself is placed on the top of a box containing a diffuse light source (or possibly under a source of diffuse light, in case the random master screen is a microlens structure and the moire intensity profile is observed by reflection). If the authentication is made by visualization, i.e. by a human operator, human biosystems (a human eye and brain) are used as a means for the acquisition of the moire intensity profile produced by the superposition of the random basic screen and the random master screen, and as a means for comparing the acquired moire intensity profile with a reference (or memorized) moire intensity profile. The source of light in this case may be either natural (such as daylight) or artificial.

Figure 17:
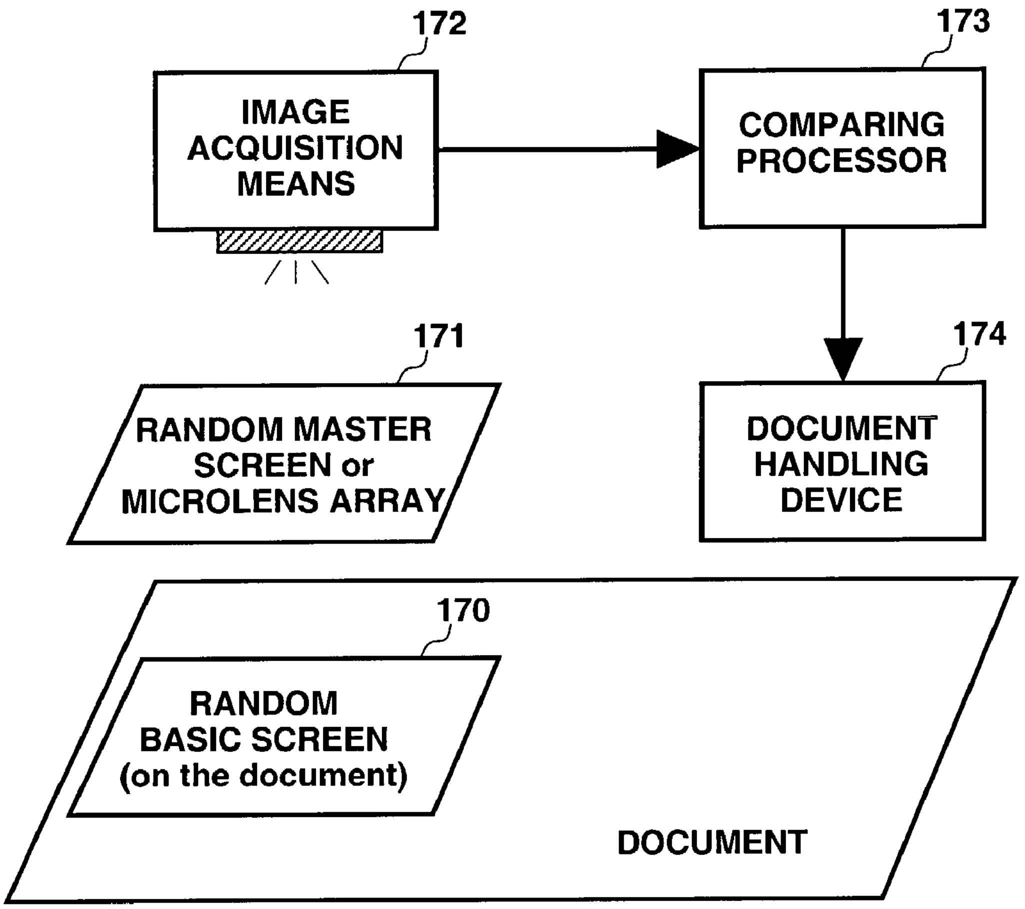
FIG. 17 is a block diagram of an apparatus for the authentication of documents by using the intensity profile of moire patterns between random layers.

An apparatus for the automatic authentication of documents, whose block diagram is shown in FIG. 17, comprises a random master screen 171 (either a dot-screen or a microlens structure), an image acquisition means (172) such as a camera, a source of light (not shown in the drawing), and a comparing processor (173) for comparing the acquired moire intensity profile with a reference moire intensity profile. In case the match fails, the document will not be authenticated and the document handling device of the apparatus (174) will reject the document. The comparing processor 173 can be realized by a microcomputer comprising a processor, memory and input-output ports. An integrated one-chip microcomputer can be used for that purpose. For automatic authentication, the image acquisition means 172 needs to be connected to the microcomputer incorporating the comparing processor 173, which in turn controls a document handling device 174 for accepting or rejecting a document to be authenticated, according to the comparison operated by the microprocessor.

The reference moire intensity profile can be obtained either by image acquisition (for example by means of a camera) of the superposition of a sample basic screen and the master screen, or it can be obtained by precalculation.

The comparing processor makes the image comparison by matching a given image with a reference image; examples of ways of carrying out this comparison have been presented in detail by Amidror and Hersch in U.S. Pat. No. 5,995,638. This comparison produces at least one proximity value giving the degree of proximity between the acquired moire intensity profile and the reference moire intensity profile. These proximity values are then used as criteria for making the document handling device accept or reject the document.

ADVANTAGES OF THE PRESENT INVENTION

The advantages of the new authentication and anti-counterfeiting methods and devices disclosed in the present invention are numerous.

First, random (and optionally geometrically) transformed dot-screens are much more difficult to design, and therefore very hard to reverse engineer and to counterfeit.

Second, a major advantage of the present invention is in its built-in encryption system due to the arbitrary choice of the random number sequences for the generation of the specially designed random dot screens that are used in this invention. This provides an additional protection at the same price.

The fact that moire effects generated between superposed dot-screens are very sensitive to any microscopic variations in the screened layers makes any document protected according to the present invention practically impossible to counterfeit, and serves as a means to easily distinguish between a real document and a counterfeited one.

Furthermore, unlike previously known moire-based anti-counterfeiting methods, which are only effective against counterfeiting by digital equipment (digital scanners or photocopiers), the present invention is equally effective in the cases of analog or digital equipment.

A further important advantage of the present invention is that it can be used for authenticating documents printed on any kind of support, including paper, plastic materials, etc., which may be transparent or opaque. Furthermore, the present invented method can be incorporated into halftoned B/W or color images (simple constant images, tone or color gradations, or complex photographs). Because it can be produced using the standard document printing process, the present method offers high security at the same cost as standard state of the art document production.

Figure 10A:
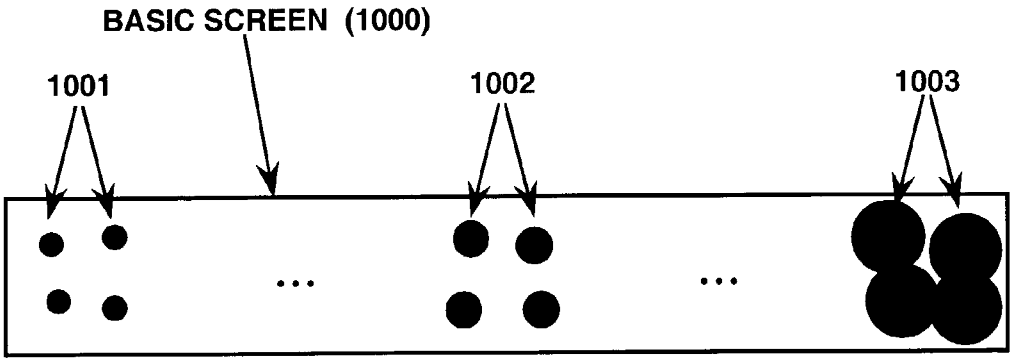
FIG. 10A shows schematically a variable intensity random basic screen whose screen dots vary gradually in their size according to the gray levels.
Figure 10B:
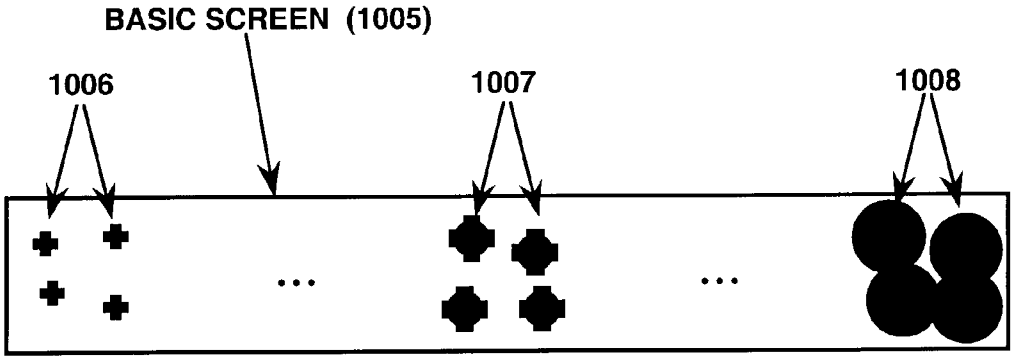
FIG. 10B shows schematically a variable intensity random basic screen whose screen dots vary gradually both in their size and in their shapes according to the gray levels.
Figure 10C:
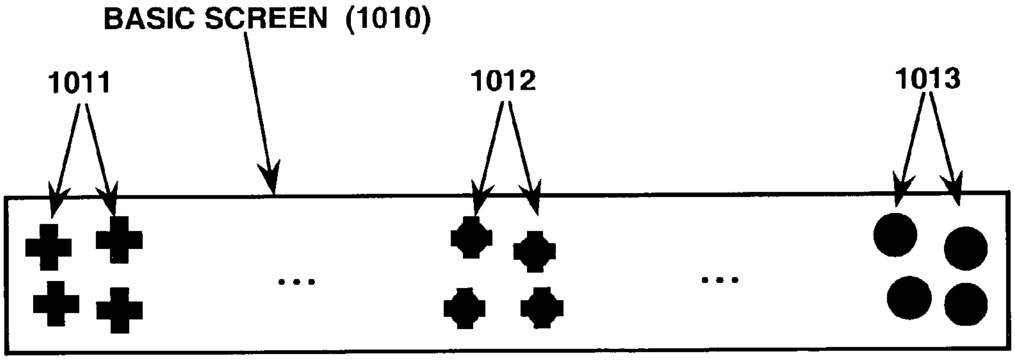
FIG. 10C shows schematically a constant intensity random basic screen whose screen dots vary gradually in their shapes according to their position within the basic screen, without affecting the intensity levels.

Furthermore, the random dot-screens printed on the document in accordance with the present invention need not be of a constant intensity level. On the contrary, they may include dots of gradually varying sizes and shapes, and they can be incorporated (or dissimulated) within any variable intensity halftoned image on the document (such as a portrait, landscape, or any decorative motif, which may be different from the motif generated by the moire effect in the superposition). It should be noted that in addition to the variation in the shape and the size of the random basic screen dots according to the gray levels, as shown schematically in FIG. 10A and FIG. 10B, in an alternative variant the shape of the basic screen dots may be varied according to their position within the image, without affecting the gray level. For example, as illustrated schematically in FIG. 10C, a band with random basic screen 1010 of a constant gray level, consisting of gradually varying dot shapes (1011–1013), may be located along the border of the document. When the corresponding random master screen is superposed, the resulting moire intensity profile will vary in its shape along this band. Similarly, the color of the basic screen dots may be also gradually varied according to their position within the image. In this case, when the corresponding master screen is superposed, the resulting moire intensity profile will vary in its color along the band. Each of these variants has the advantage of making counterfeiting still more difficult, thus further increasing the security provided by the present invention.

Yet a further advantage of the present invention is that it can be used, depending on the needs, either as an overt means of document protection which is intended for the general public; or as a covert means of protection which is only detectable by the competent authorities or by automatic authentication devices; or even as a combination of the two, thereby permitting various levels of protection.

REFERENCES CITED

U.S. Patent Documents

U.S. Pat. No. 5,995,638 (Amidror, Hersch), November 1999. Methods and apparatus for authentication of documents by using the intensity profile of moire patterns.

U.S. Pat. No. 6,249,588 (Amidror, Hersch), June 2001. Method and apparatus for authentication of documents by using the intensity profile of moire patterns.

U.S. patent application Ser. No. 09/902,445 (Amidror, Hersch). Authentication of documents and valuable articles by using moire intensity profiles. Filed Jul. 11, 2001.

U.S. Pat. No. 5,018,767 (Wicker), May 1991. Counterfeit protected document.

U.S. Pat. No. 5,275,870 (Halope et al.), January 1994. Watermarked plastic support.

U.S. Pat. No. 5,396,559 (McGrew), March 1995. Anti-counterfeiting method and device utilizing holograms and pseudorandom dot patterns.

U.S. Pat. No. 5,712,731 (Drinkwater et. al.), January 1998. Security device for security documents such as bank notes and credit cards.

U.S. Pat. No. 6,198,545 (Ostromoukhov, Hersch), March 2001. Method and apparatus for generating halftone images by evolutionary screen dot contours.

U.S. patent application Ser. No. 09/477,544 (Ostromoukhov, Hersch). Method and apparatus for generating digital halftone images by multi color dithering. Filing date: Jan. 4, 2000.

U.S. Pat. No. 5,613,013 (Schuette), March 1997. Glass patterns in image alignment and analysis.

Foreign Patent Documents

United Kingdom Patent No. 1,138,011 (Canadian Bank Note Company), December 1968. Improvements in printed matter for the purpose of rendering counterfeiting more difficult.

United Kingdom Patent Application No. 2,224,240 A (Kenrick & Jefferson), May 1990. Copy protection of multicolor documents.

Other Publications

Glass patterns revisited: a unified approach for the explanation of stochastic and periodic moires, by I. Amidror. Submitted to the Journal of the Opt. Soc. of America A, 2002.

Fourier-based analysis and synthesis of moires in the superposition of geometrically transformed periodic structures, by I. Amidror and R. D. Hersch; Journal of the Optical Society of America A, Vol. 15, 1998; pp. 1100–1113.

The Theory of the Moire Phenomenon, by I. Amidror, Kluwer Academic Publishers, 2000.

A Generalized Fourier-Based Method for the Analysis of 2D Moire Envelope-Forms in Screen Superpositions, by I. Amidror; Journal of Modern Optics, Vol. 41, No. 9, 1994; pp. 1837–1862.

Microlens arrays, by M. Hutley et al.; Physics World, July 1991; pp. 27–32.

New imaging functions of moire by fly's eye lenses, by O. Mikami; Japan Journal of Applied Physics, Vol. 14, No. 3, 1975; pp. 417–418.

New image-rotation using moire lenses, by O. Mikami; Japan Journal of Applied Physics, Vol. 14, No. 7, 1975; pp. 1065–1066.

Artistic screening, by V. Ostromoukhov and R. D. Hersch; SIGGRAPH Annual Conference, 1995, pp. 219–228.

Multi-color and artistic dithering, by V. Ostromoukhov and R. D. Hersch; SIGGRAPH Annual Conference, 1999, pp. 425–432.

Application of laser technology to introduce security features on security documents in order to reduce counterfeiting, by W. Hospel; SPIE Vol. 3314, 1998, pp. 254–259.

Halftone patterns for arbitrary screen periodicities, by T. S. Rao and G. R. Arce; Journal of the Opt. Soc. of America A, Vol. 5, 1988, pp. 1502–1511.

Halftone images: spatial resolution and tone reproduction, by O. Bryngdahl; Journal of the Opt. Soc. of America, Vol. 68, 1978, pp. 416–422.

Moire effect from random dots, by L. Glass; Nature, Vol. 223, August 1969, pp. 578–580.

Perception of random dot interference patterns, by L. Glass and R. Perez; Nature, Vol. 246, December 1973, pp. 360–362.

CRC Concise Encyclopedia of Mathematics, by E. W. Weisstein, CRC, Boca Raton, 1999, pp. 176, 653.

I claim:

1. A method for authenticating documents by using at least one moire intensity profile, the method comprising the steps of:

a) creating on a document at least one basic screen with at least one basic screen dot shape;

b) superposing a master screen with a master screen dot shape and the basic screen, thereby producing a moire intensity profile; and c) comparing said moire intensity profile with a reference moire intensity profile and depending on the result of the comparison, accepting or rejecting the document;

where each basic screen is a random basic screen comprising randomly located dots having basic screen dot shape, the master screen is a random master screen comprising randomly located dots having master screen dot shape, and the master and basic screens have essentially the same random dot locations, wherein the basic screen dot shape and the master screen dot shape are different.

2. The method of claim 1, where the reference moire intensity profile is obtained by image acquisition of the superposition of the basic screen and the master screen.

3. The method of claim 1, where the reference moire intensity profile is obtained by precalculation.

4. The method of claim 1, where the reference moire intensity profile is a memorized reference moire intensity profile seen previously in a superposition of a basic screen and a master screen in documents that are known to be authentic.

5. The method of claim 1, where comparing the moire intensity profile with a reference moire intensity profile is done by visualization.

6. The method of claim 1, where the basic screen and the master screen are located on a transparent support, and where comparing the moire intensity profile with a reference moire intensity profile is done by visualization.

7. The method of claim 6, where the basic screen and the master screen are located on two different areas of the same document, thereby enabling the visualization of the moire intensity profile to be performed by superposition of the basic screen and the master screen of said document.

8. The method of claim 1, where the basic screen is created by a process for transferring an image onto a support, said process being selected from the set comprising lithographic, photolithographic, photographic, electrophotographic, engraving, etching, perforating, embossing, ink jet and dye sublimation processes.

9. The method of claim 1, where the master screen is created by a process for transferring an image onto a support, said process being selected from the set comprising lithographic, photolithographic, photographic, electrophotographic, engraving, etching, perforating, embossing, ink jet and dye sublimation processes.

10. The method of claim 1, where at least one screen selected from the set comprising the basic screen and the master screen contains tiny dots.

11. The method of claim 1, where at least one screen selected from the set comprising the basic screen and the master screen is a pinhole screen.

12. The method of claim 1, where at least one screen selected from the set comprising the basic screen and the master screen is obtained by perforation.

13. The method of claim 1, where at least one screen selected from the set comprising the basic screen and the master screen is obtained by etching.

14. The method of claim 1, where the basic screen is a multichromatic basic screen whose individual elements are colored, thereby generating a color moire image when the master screen is superposed on said basic screen.

15. The method of claim 1, where the basic screen is a masked basic screen, thereby offering a covert means of authentication and making the re-engineering of the basic screen of the document extremely difficult.

16. The method of claim 1, where at least one screen selected from the set comprising the basic screens and the master screen includes dots whose shapes gradually vary according to their position, thereby generating in the screen superposition moire intensity profiles which vary in their shapes according to their position.

17. The method of claim 1, where at least one screen selected from the set comprising the basic screens and the master screen includes dots whose colors gradually vary according to their position, thereby generating in the screen superposition moire intensity profiles which vary in their colors according to their position.

18. The method of claim 1, where at least one screen selected from the set comprising the basic screens and the master screen includes dots of gradually varying shapes and is incorporated within a variable intensity halftoned image.

19. The method of claim 18, where at least one screen is a color halftoned image.

20. The method of claim 1, where at least one screen selected from the set comprising the basic screens and the master screen is a microlens structure.

21. The method of claim 20, where the document comprising the basic screen is printed on an opaque support, thereby allowing the moire intensity profile to be produced by reflection.

22. The method of claim 20, where the basic screen is located on an opaque support, and where comparing the moire intensity profile with a reference moire intensity profile is done by visualization.

23. The method of claim 1, where the random basic screens and the random master screen are generated using a random number sequence that is kept secret, thus preventing unauthorized production of a random master screen that can reveal the moire intensity profile when superposed on the random basic screen of the document.

24. The method of claim 23, where the random number sequence depends on a parameter of the document, thus providing a built-in encryption system and excluding the possibility of using a master screen belonging to another document.

25. The method of claim 24, where the parameter of the document used for the generation of the random number sequence is the serial number of the document.

26. The method of claim 1, where the document is a valuable article.

27. The method of claim 1, where the document is a package of a valuable product.

28. The method of claim 27, where at least one basic screen and at least one master screen are located in different parts of the product package.

29. The method of claim 1, where the document is affixed to a valuable product.

30. The method of claim 29, where at least one basic screen and at least one master screen are located in different parts of the document that is affixed to the valuable product.

31. The method of claim 1, where at least one screen selected from the set comprising the basic screens and the master screen is located on a valuable product, and where at least one other screen selected from the same set is located on the valuable product's package.

32. An apparatus for authentication of documents making use of at least one moire intensity profile, the apparatus comprising:

a) a master screen;

b) an image acquisition means arranged to acquire a moire intensity profile produced by the superposition of a basic screen located on a document and the master screen; and c) a comparing means operable for comparing the acquired moire intensity profile with a reference moire intensity profile;

where each basic screen is a random basic screen comprising randomly located dots having basic screen dot shape, the master screen is a random master screen comprising randomly located dots having master screen dot shape, and the master and basic screens have essentially the same random dot locations, wherein the basic screen dot shape and the master screen dot shape are different.

33. The apparatus of claim 32, where the image acquisition means and comparing means are human biosystems, a human eye and brain respectively.

34. The apparatus of claim 32, where the comparing means is a comparing processor controlling a document handling device accepting, respectively rejecting a document to be authenticated, according to the comparison operated by the comparing processor.

35. The apparatus of claim 34, where the comparing processor is a microcomputer comprising a processor, memory and input-output ports and where the image acquisition means is a camera connected to said microcomputer.

36. The apparatus of claim 32 where the master screen is a microlens structure.

37. A method for authenticating documents by using at least one moire intensity profile, the method comprising the steps of:

a) creating on a document at least one basic screen with at least one basic screen dot shape; and b) superposing a master screen with a master screen dot shape and the basic screen, thereby producing a moire intensity profile which is apparent to a human eye;

where each basic screen is a random basic screen comprising randomly located dots having basic screen dot shape, the master screen is a random master screen comprising randomly located dots having master screen dot shape, and the master and basic screens have essentially the same random dot locations, wherein the basic screen dot shape and the master screen dot shape are different.

38. The method of claim 37, where at least one screen selected from the set comprising the basic screens and the master screen is obtained by perforation.

39. The method of claim 37, where at least one screen selected from the set comprising the basic screens and the master screen is obtained by etching.

40. The method of claim 37, where at least one screen selected from the set comprising the basic screens and the master screen is a microlens structure.

41. A security device for authentication of documents comprising at least one basic screen with at least one basic screen dot shape, that is located on the document, where the document authentication is done by superposing a master screen with a master screen dot shape and a basic screen, thereby producing a moire intensity profile and permitting the comparison of said moire intensity profile with a reference moire intensity profile and the acceptance or the rejection of the document depending on the result of the comparison, and where each basic screen is a random basic screen comprising randomly located dots having basic screen dot shape, the master screen is a random master screen comprising randomly located dots having master screen dot shape, and the master and basic screens have essentially the same random dot locations, wherein the basic screen dot shape and the master screen dot shape are different.

42. The security device of claim 41, where the basic screen is a multichromatic basic screen whose individual elements are colored, thereby generating a color moire image when the master screen is superposed on said basic screen.

43. The security device of claim 41, where at least one screen selected from the set comprising the basic screens and the master screen includes dots whose shapes gradually vary according to their position, thereby generating in the screen superposition moire intensity profiles which vary in their shapes according to their position.

44. The security device of claim 41, where at least one screen selected from the set comprising the basic screens and the master screen includes dots whose colors gradually vary according to their position, thereby generating in the screen superposition moire intensity profiles which vary in their colors according to their position.

45. The security device of claim 41, where at least one screen selected from the set comprising the basic screens and the master screen includes dots of gradually varying shapes and is incorporated within a variable intensity halftoned image.

46. The security device of claim 45, where at least one screen is a color halftoned image.

47. The security device of claim 41, where at least one screen selected from the set comprising the basic screens and the master screen is obtained by perforation.

48. The security device of claim 41, where at least one screen selected from the set comprising the basic screens and the master screen is obtained by etching.

49. The security device of claim 41, where the document is a valuable article.

50. The security device of claim 41, where the document is a package of a valuable product.

51. The security device of claim 41, where the document is affixed to a valuable product.

52. The security device of claim 41, where at least one screen selected from the set comprising the basic screens and the master screen is located on a valuable product, and where at least one other screen selected from the same set is located on the valuable product's package.

53. A security document protected by a security device, said security device comprising at least one basic screen with at least one basic screen dot shape, that is located on the document, where the document authentication is done by superposing a master screen with a master screen dot shape and a basic screen, thereby producing a moire intensity profile and permitting the comparison of said moire intensity profile with a reference moire intensity profile and the acceptance or the rejection of the document depending on the result of the comparison, and where each basic screen is a random basic screen comprising randomly located dots having basic screen dot shape, the master screen is a random master screen comprising randomly located dots having master screen dot shape, and the master and basic screens have essentially the same random dot locations, wherein the basic screen dot shape and the master screen dot shape are different.

54. The security document of claim 53, where said security document is an optical disk.

55. The security document of claim 53, where said security document is a package of a valuable product.

56. The security document of claim 53, where the random basic screens and the random master screen are generated using a random number sequence that depends on a parameter of the document, thus providing a built-in encryption system and excluding the possibility of using a master screen belonging to another document.

57. The method of claim 56, where the parameter of the document used for the generation of the random number sequence is the serial number of the document.

* * * * *